(12) United States Patent
Fine et al.

(10) Patent No.: US 12,172,890 B1
(45) Date of Patent: *Dec. 24, 2024

(54) METHOD AND APPARATUS FOR MANUFACTURING NITROGEN TETROXIDE

(71) Applicant: VERO Biotech Inc., Atlanta, GA (US)

(72) Inventors: David H. Fine, Cocoa Beach, FL (US); Thorsten Schmidt, Decatur, GA (US); Bryan Johnson, Orlando, FL (US); Alessandra Miranda, West Melbourne, FL (US); Edward Bromberg, Orlando, FL (US); Marjorie Nelson, Cocoa, FL (US)

(73) Assignee: VERO Biotech Inc., Atlanta, GA (US)

( * ) Notice: Subject to any disclaimer, the term of this patent is extended or adjusted under 35 U.S.C. 154(b) by 429 days.

This patent is subject to a terminal disclaimer.

(21) Appl. No.: 17/559,745

(22) Filed: Dec. 22, 2021

Related U.S. Application Data

(63) Continuation of application No. 16/515,661, filed on Jul. 18, 2019, now Pat. No. 11,208,326.

(60) Provisional application No. 62/699,771, filed on Jul. 18, 2018.

(51) Int. Cl.
*C01B 21/24* (2006.01)
*B01D 3/14* (2006.01)
*C01B 21/36* (2006.01)

(52) U.S. Cl.
CPC ............ *C01B 21/36* (2013.01); *B01D 3/143* (2013.01); *C01B 21/24* (2013.01)

(58) Field of Classification Search
CPC .............................. C01B 21/24; C01B 21/36
See application file for complete search history.

(56) References Cited

U.S. PATENT DOCUMENTS

| | | |
|---|---|---|
| 3,607,076 A | 9/1971 | Paine et al. |
| 11,208,326 B1 | 12/2021 | Fine et al. |

OTHER PUBLICATIONS

Non-Final Office Action issued by the United States Patent and Trademark Office for U.S. Appl. No. 16/515,661, dated Mar. 10, 2021, 5 pages.

*Primary Examiner* — Sikarl A Witherspoon
(74) *Attorney, Agent, or Firm* — Meunier Carlin & Curfman LLC

(57) ABSTRACT

Dinitrogen tetroxide ($N_2O_4$) is synthesized in an apparatus by the reaction of concentrated nitric acid with copper. Oxygen is applied as a carrier gas to convert NO to $NO_2$, and water vapor is removed with a tube dryer. A molecular sieve is applied to reduce and remove impurities.

7 Claims, 14 Drawing Sheets

METHOD AND APPARATUS FOR MANUFACTURING NITROGEN TETROXIDE

CROSS REFERENCE TO RELATED APPLICATIONS

The present application is a continuation of U.S. patent application Ser. No. 16/515,661, filed Jul. 18, 2019, which claims priority to U.S. Provisional Pat. App. Ser. No. 62/699,771, filed Jul. 18, 2018, each entitled "Method and Apparatus for Manufacturing Nitrogen Tetroxide," and the entire disclosure of each which is hereby incorporated by reference.

TECHNICAL FIELD

The invention relates to a method and system for manufacturing nitrogen tetroxide.

BACKGROUND

Nitrogen tetroxide is made industrially as part of the commercial manufacture of nitric acid by the Ostwald process. While suitable for the large scale production of nitrogen tetroxide ($N_2O_4$) for use as the oxidizer for hypergolic rocket engines, the process is unsuitable for the cGMP (Current Good Manufacturing Process) manufacture of small quantities of highly purified $N_2O_4$ for medicinal purposes.

SUMMARY

In general, $N_2O_4$ can be synthesized by a procedure chosen to guarantee high purity. For example, $N_2O_4$ can be synthesized with only two reagents, pure copper (e.g., 99.99%+purity, up to 99.9999%) and nitric acid (e.g., NF grade) in a single synthetic step. Oxygen sweep gas can oxidize trace amounts of NO that may be formed to $NO_2$. $N_2O_4$ can be condensed from $NO_2$ by cold temperature. The resultant material can be condensed with a glass condenser and stored over a molecular sieve. Processing with all glass can minimize impurities, particularly metal impurities. A Nafion drier can reduce water since some of the water converts $N_2O_4$ to nitric acid. The process can minimize possible impurities since there are few atomic species other than N-atoms, O-atoms, copper-atoms and H-atoms are present during synthesis. In some embodiments, there can be zero metals other than copper, and/or zero organics, because the only possible molecules present in the product, given the precursors, vessels, and catalysts, can be $HNO_3$, $HNO_2$, NO, $NO_2$, $N_2O_3$, $Cu(NO_3)_2$ and/or $H_2O$.

The $N_2O_4$ can be maintained in a purified state by storing over molecular sieves and oxygen. Storage over molecular sieves can remove $HNO_3$ and $H_2O$. Storage over molecular sieves can produce some NO which can be converted to $NO_2$ by having an $O_2$ blanket over the liquid. Distillation can be used to purify the $N_2O_4$ but that approach is less preferred. Experimental data indicates that such a process can reduce $HNO_3$ to 0.049% or less and/or $H_2O$ to 0.0176% or less.

Another general feature described here is that ampoule filling can be carried out in a moisture free environment. Because any moisture that gets into the $N_2O_4$ during the filling process can cause $HNO_3$ to form, in some embodiments, great care can be taken to prevent moisture from condensing into the cold $N_2O_4$ during the filling process. In some embodiments, the filling process can be carried out in an environment where the dew point is below −20 degrees C., and/or below −40 degrees C. A dew point monitor installed in the filling chamber can aid in the monitoring and prevention of moisture contaminating the $N_2O_4$. Furthermore, in some embodiments, the cold $N_2O_4$ may not be exposed to the environment in the filling chamber for more than a fraction of a second. An automated procedure can be used to ensure the atmospheric exposure is for less than a fraction of a second. Once liquid is in the ampoule, it can be chilled to liquid nitrogen temperature so as to allow sealing of the glass ampoule. The sealing can be flame sealing. In other embodiments, a laser or other non-combustion heat source can be used instead of a flame because a non-combustion heat source does not produce water vapor.

Furthermore, temperature can be precisely controlled while filling an ampoule with $N_2O_4$. This can be accomplished, for example, by dispensing $N_2O_4$ as a cold liquid at a temperature just above its freezing point. The $N_2O_4$ can thus be frozen immediately (e.g., within less than 10 seconds, less than 5 seconds, less than 1 second, etc.) after liquid is dispensed. The liquid $N_2O_4$ can be dispensed, for example, using a pipette, filling tube or other mechanism. In certain examples, filling can include automated pipettes and filing a loop with the liquid and ejecting the contents of the loop into the ampoule. The $N_2O_4$ can be maintained and/or dispensed as a liquid between −5 degrees C. and −10 degrees C. The ampule containing the $N_2O_4$ can be chilled (e.g., using liquid nitrogen) within seconds of the $N_2O_4$ being dispensed in preparation for sealing.

A burst test can be used to stress the glass ampule after filling and sealing. A glass ampoule after flame or laser sealing typically has a stress point at the seal due to incomplete annealing. $N_2O_4$ vapor could be present during sealing, which can further compromise the seal. If humidity control is not adequate, moisture could also be present on the outside of the glass, causing greater stress. One solution to this problem can be to subject ampoules after sealing to a temperature of greater than the highest that it is likely to encounter (e.g., greater than 50 degrees C., greater than 70 degrees C., greater than 90 degrees C., etc. and verify that the seal has integrity and does not rupture at such an elevated temperature. In some embodiments, such a burst test can be a batch process where several hundred ampoules can be tested at a time for several hours, or the process can be continuous.

Infrared spectroscopy can be used to test for $N_2O_4$ in sealed glass ampoules. The test, for example, FTIR (Fourier-transform infrared spectroscopy), can be done on the ampoules as prepared for shipping and/or use, rather than, for example, in a separate spectroscopy cuvette. The FTIR can operate in a near infrared spectrum range. FTIR instruments are typically configured analyze liquid samples that are in a cuvette that is made with optically flat walls. Embodiments described herein, however, typically involve $N_2O_4$ in round tubular glass ampoules. Typical FTIR measurements involving a cuvette may be of little value, since the transfer from the sealed cuvette to the ampule is likely to introduce moisture and other contaminants. Thus, some embodiments described herein relate to using a holder to support an ampoules so that the light path from the FTIR instrument is always at the same geometrical position of a ampoule, typically, a diametric light path. This then can allow FTIR is to be used in a conventional manner, for the specific potential contaminants of $H_2O$, $HNO_3$, as well as $N_2O_3$ in final ampoule as shipped. The FTIR spectrum can act as a fingerprint of the $N_2O_4$. An impurity of NO can be detected by detecting $N_2O_3$. NO does not give a spectra in the FTIR range, but when NO is bubbled thru $N_2O_4$ a new peak appears, at the wavelength due to $N_2O_3$. The $N_2O_3$ peak can be used to determine the amount of NO that is present in the $N_2O_4$.

In one aspect, a method for manufacturing $N_2O_4$ can include mixing nitric acid with copper pellets in a reaction vessel, allowing water from the reaction to dilute the nitric acid and produce NO and $NO_2$ in a reaction slurry, allowing $NO_2$ gas to desorb from the reaction slurry along with some nitric acid and water vapor, applying $O_2$ (e.g., USP grade A or better) as a carrier gas to convert NO to $NO_2$, removing water vapor by using a tube dryer distilling over a molecular sieve to reduce impurity levels and remove nitric acid, and allowing $NO_2$ to dimerize to $N_2O_4$.

In another aspect, a method of ampoule filling can include providing liquid $N_2O_4$ in a glass ampoule as a filling chamber, providing a dew point monitor in the filling chamber, maintaining an environment where the dew point is below $-20°$ C., for example, below $-40°$ C., preventing moisture from condensing into cold $N_2O_4$ during the filling process, and heating on end of the glass ampoule to form a hermetic glass seal. For example, the filling operation can be conducted in a cold room, where the temperature of the room is below minus $20°$ C. or below minus $40°$ C.

In another aspect, a method of stress testing an ampoule can include subjecting a glass ampoule to temperature higher than it is expected to reach during filling, filling the ampoule with $N_2O_4$ as a cold liquid between $-5°$ C. and $-10°$ C. into an ampoule, immediately after dispensing the liquid $N_2O_4$, chilling the ampoule; and preparing the ampoule for sealing.

In another aspect, a system for testing $N_2O_4$ can include providing a plurality of round glass ampoules, arranging the round sealed glass ampoules in a holder that maintains a light path in the same geometrical position of the round glass ampoules, and testing the glass ampoules with infrared spectroscopy (i.e., Fourier Transform Infra-Red (FTIR) spectroscopy) to detect and measure $H_2O$, $HNO_3$ and/or $N_2O_3$ in the ampoule.

In another aspect, a method of calibration for a purity test can include providing $N_2O_4$ in an ampoule, adding $HNO_3$ to pure $N_2O_4$, generating a $HNO_3$ impurity calibration graph with no water present, adding $H_2O$ to pure $N_2O_4$, generating a tentative $H_2O$ calibration curve, measuring a peak for $HNO_3$ by applying infrared spectroscopy (i.e., Fourier Transform Infra-Red (FTIR) spectroscopy) when only $H_2O$ is added, calculating the amount of $HNO_3$ formed from the $HNO_3$ impurity calibration graph and converting it into $H_2O$ equivalents, and measuring the water, nitric acid and NO impurities in the $N_2O_4$ in an ampoule.

In another aspect, a method of analyzing $N_2O_4$ can include providing NO, bubbling NO through $N_2O_4$, measuring a peak at a wavelength due to $N_2O_3$ by applying infrared spectroscopy (i.e., Fourier Transform Infra-Red (FTIR) spectroscopy) and applying the measured peak formed due to $N_2O_3$ as a measurement of trace NO. In certain circumstances, the method can include recovering $NO_2$ from waste copper nitrate by heating.

In another aspect, a method for synthesizing pure nitrogen dioxide can include providing a controlled amount of nitric acid to copper to produce $NO_2$, and applying an oxygen sweep gas to oxidize any trace NO formed to $NO_2$ to form a gas source including nitrogen dioxide.

Other aspects, embodiments, and features will be apparent from the following description, the drawings, and the claims.

DETAILED DESCRIPTION

Figure 1:
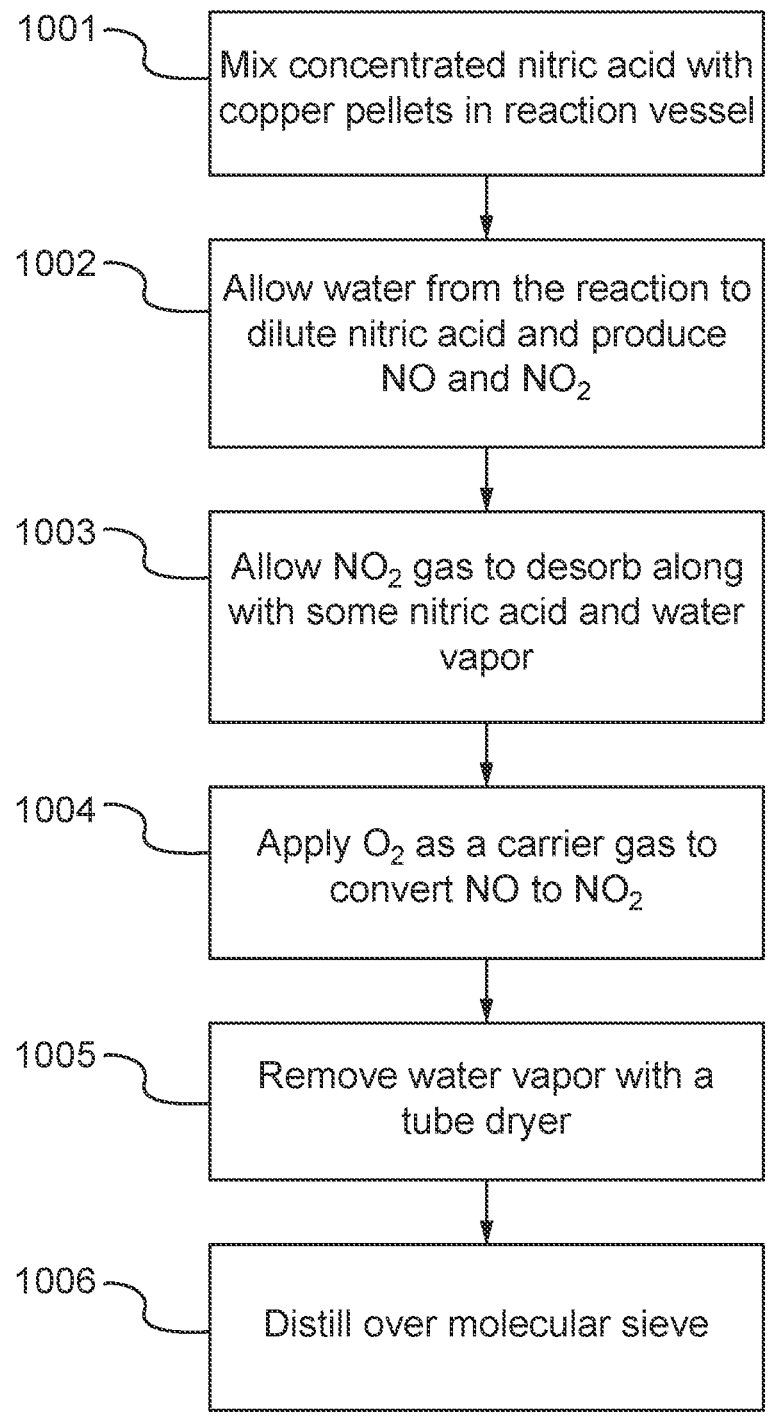
FIG. 1 is a flow chart of a process of synthesizing $N_2O_4$, according to an embodiment.

Dinitrogen tetroxide ($N_2O_4$), commonly referred to as nitrogen tetroxide forms an equilibrium mixture with nitrogen dioxide. Dinitrogen tetroxide can be made through the reaction of concentrated nitric acid and metallic copper. The oxidation of copper by nitric acid is a complex reaction forming various nitrogen oxides of varying stability which depends on the concentration of the nitric acid, presence of oxygen, and other factors. The unstable species further react to form nitrogen dioxide which is then purified and condensed to form dinitrogen tetroxide.

According to an embodiment, dinitrogen tetroxide ($N_2O_4$) can be synthesized in an all glass apparatus by the reaction of concentrated (e.g., 70% or greater) nitric acid ($HNO_3$) with copper. Reddish brown nitrogen dioxide ($NO_2$) is evolved. Copper nitrate ($Cu(NO_3)_2$) is a waste product. $NO_2$ can be readily recovered from the waste copper nitrate by heating.

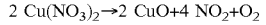

$$2\,Cu(NO_3)_2 \rightarrow 2\,CuO + 4\,NO_2 + O_2$$

However, given the relatively low cost of copper and nitric acid, the excess copper nitrate can also be discarded.

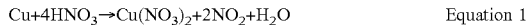

$$Cu + 4HNO_3 \rightarrow Cu(NO_3)_2 + 2NO_2 + H_2O \qquad \text{Equation 1}$$

The $NO_2$ can be swept with oxygen ($O_2$) through a condensing column where the majority of the water is removed, and then further dried over Nafion® or other suitable tubing before being condensed at a temperature that is near dry ice temperature and typically well below $21°$ C., the condensing temperature for the dimer, $N_2O_4$.

$$2NO_2 \rightleftharpoons N_2O_4 \qquad \text{Equation 2}$$

The dimer can be distilled in a second process through a molecular sieve bed, which removes most of the remaining nitric acid ($HNO_3$) and water ($H_2O$). Alternatively, instead of processing the $N_2O_4$ a second time, the same effect can be achieved by storing over molecular sieve. In the presence of $O_2$ any NO and/or $N_2O_3$ can be converted into $NO_2$.

Approximately one half (0.5) ml can be dispensed into glass ampules in an ultra-low humidity controlled environment. Such ampules can then be sealed. The glass ampules containing the $N_2O_4$ can be placed in a small disposable cassette for use with an Acute Delivery System (ADS)—a system for the delivery of NO to a patient or user. The ADS can include a cassette that can be activated at the bedside to produce nitric oxide from the $N_2O_4$ stored in the ampules for inhalation or other suitable therapy.

At quantity, $N_2O_4$ can pose a significant safety hazard. The Occupational Safety and Health Administration (OSHA) has promulgated regulations that dictate that workers' exposure to $NO_2$ should never exceed 5 PPM. Because $N_2O_4$ reacts readily to form $NO_2$, and given the FDA in its 2000 Guidance document has defined the room size as 3.1×6.2×4.65 meter; without air exchange, a volume of 0.5 ml of $N_2O_4$, if suddenly released and vaporized during a catastrophic accident, would lead to a $NO_2$ level in the room of less than 5 PPM. Therefore, it may be advantageous for an ampule to contain 0.5 ml of $N_2O_4$ or less.

According to some embodiments, the maximum acceptable impurities level in the $N_2O_4$, as determined by Fourier Transform Infra-Red (FTIR) spectroscopy, are <0.1% for $H_2O$, <0.5% for $HNO_3$, with no detectable peak for NO (as $N_2O_3$), which is equivalent to <0.01%. Experimentally verified typical values of $N_2O_4$ synthesized and processed according to the methods described herein are 0.05% $H_2O$ and 0.018% $HNO_3$. FTIR measurements described herein are carried out using the glass ampules as cuvettes; allowing for direct non-destructive chemical analysis of the final product in the actual ampules used in the disposable cassette.

The presence of copper and other metals in the $N_2O_4$ synthesized and processed according to methods described herein have been experimentally measured by ICP-MS (inductively coupled plasma mass spectrometry) and found to be undetectable (detection limit 0.3 ppm). Organic compounds in the $N_2O_4$ synthesized and processed according to methods described herein have been experimentally verified to be below detection limits.

During use in the ADS console, the $N_2O_4$ is vaporized to produce $NO_2$, which is then passed through two sintered silica gel cartridges coated with moist ascorbic acid, which oxidizes the $NO_2$ to NO, for delivery to the patient for inhalation therapy. The cartridges are also designed to remove all volatile organics, and have been shown to block the passage of nitric acid vapors.

Synthesis

Nitrogen tetroxide is made industrially as part of the commercial manufacture of nitric acid by the Ostwald process. While suitable for the large scale production of $N_2O_4$ for use as the oxidizer for hypergolic rocket engines, the process is unsuitable for the cGMP manufacture of small quantities of highly purified $N_2O_4$ for medicinal purposes.

Referring to FIG. 1, a novel method of synthesis includes certain advantages including purity, simplicity and safety. The synthesis is carried out as a single stage batch process. As an initial step, concentrated nitric acid (e.g., 70% or greater) and pure copper pellets are mixed in a reaction vessel 1001. The two starting ingredients, nitric acid and copper are widely available in high purity from several sources. Nitric acid is a key industrial chemical that is available as NF grade and is shipped in glass containers. Copper at 99.9995% purity is readily available because of its widespread use in the electronics industry. Further, by starting with a liquid and a solid and having a product that is a liquid, the size and scale of the equipment is miniscule when compared to manufacturing the material in the gas phase. The size reduction by working in the liquid phase is approximately 2000 times smaller, because $N_2O_4$ gives 2 $NO_2$ and the volume reduction in going from a gas to a liquid accounts for a size reduction factor of approximately 1000. Thus, embodiments described herein allow for the shipment of the glass ampoules that contain essentially pure liquid $N_2O_4$, as compared to known methods which typically involve packaging and an 800 PPM gas mixture of $N_2O_4$, diluted in nitrogen. Thus, the total volume reduction is approximately two million (2,000,000) fold. Furthermore, there is no need to use high pressure. The entire synthesis production line with all the controls can be configured to fit into a single walk in laboratory-style fume hood. Finally, the entire process can be conducted in an all glass apparatus. This can be important because a common impurity in the industrial processes for making $N_2O_4$ are metal salts that are leached out of the metal containment and shipping vessels.

In the second step 1002, as the reaction proceeds, the water formed in the reaction dilutes the nitric acid while the acid is also consumed and the reaction changes to produce NO as well as $NO_2$:

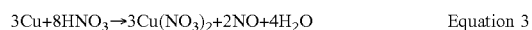

$$3Cu+8HNO_3 \rightarrow 3Cu(NO_3)_2+2NO+4H_2O \qquad \text{Equation 3}$$

The reaction can be conducted under $O_2$ (e.g. USP grade A or better) that converts any NO that may be present into $NO_2$.

$$2NO+O_2 \rightarrow 2\,NO_2 \qquad \text{Equation 4}$$

The synthesis of $N_2O_4$ is conducted by mixing nitric acid into a reaction vessel containing copper pellets, where the product of the reaction is $NO_{2(g)}$.

In a third step 1003, the $NO_2$ gas desorbs from the reaction slurry along with some nitric acid and water vapor. The gas mixture is combined with a carrier gas, oxygen, and conveyed to a condenser where some of the water and nitric acid, as well as some $NO_2$, are condensed and dripped back into the reaction vessel. The $NO_2$ vapor phase moves through Nafion dryers, tube dryers, or other suitable dryer, where excess water is removed from the gas. Nafion is a copolymer of tetrafluoroethylene (Teflon®) and perfluoro-3,6-dioxa-4-methyl-7-octene-sulfonic acid. Like Teflon, Nafion is highly resistant to chemical attack, but the presence of its exposed sulfonic acid groups confers unusual properties. Sulfonic acid has a very high water-of-hydration, absorbing 13 molecules of water for every sulfonic acid group in the polymer; consequently, Nafion absorbs 22% by weight of water. Unlike micro-porous membrane permeation, which transfers water through a relatively slow diffusion process, Nafion removes water by absorption as water-of-hydration. This absorption occurs as a First Order Kinetic reaction, so equilibrium is reached very quickly (typically within milliseconds). Because this is a specific chemical reaction with water, gases being dried or processed are usually entirely unaffected. Nafion tubing is very stable at high temperatures. Other drying materials, such as phosphorous pentoxide, can be user, but chemical drying agents have the disadvantage of potentially being a source of impurities.

In certain embodiments, the $NO_2$ gas is collected at near dry ice temperatures in a glass lined 2.5 liter stainless steel collection vessel, referred to as a Hoke®.

In a fourth step 1004, oxygen is applied as a carrier gas to convert NO to $NO_2$. The oxygen carrier gas containing some remnant $NO_2(g)$ passes through a neutralization bed and scrubber, and the gasses are then vented to a fume hood. The loss of some $NO_2$ through the vent is one reason why the final $NO_2$ yield is somewhat less than 100%.

As an example, 250 g of Copper Pellets (99.9995%) are added to a 4-liter reaction vessel heated to 75±10° C. A pump is used to pump 1.2 L of 70% NF nitric acid at 50 ml/min into the reaction vessel from the original nitric acid container. The greater the concentration of nitric acid, the greater the $N_2O_4$ yield. For example, USP Oxygen is set to flow through the synthesis system at 1.00 SLPM. The reaction is allowed to take place for 60 min, 45 min without any agitation from the moment nitric acid is added to the system. After the 45 min, the reaction vessel stirrer is used to agitate the remaining reaction material towards the end of the reaction to ensure complete consumption of the copper for the remaining 15 min.

In a fifth step 1005, water vapor is removed with a tube dryer. A Nafion tube dryers (or other suitable dryers) are downstream of the condenser column and are used to further purify the $NO_2$ by removing water vapor from the stream. A Nafion drier is a tube in a tube drier. The inner tube is made of the Nafion material and is the conduit to contain and transport the process gas, while the outer tube is a conduit to contain and transport the drying gas, USP Oxygen.

For example, after the $NO_2$ leaves the Nafion dryers, it is condensed in a cold stainless steel vessel (Hoke) that is glass coated with Silcolloy 1000™. The collection vessel is cooled to dry ice temperatures. A glass collection vessel can also be used. The $NO_2(g)$ dimerizes in the Hoke to $N_2O_4(s)$. The carrier gas and uncondensed $NO_2$ then leaves through the gas outlet of the Hoke and proceeds on to the neutralization bed.

It should be noted that some or all of the above steps can be conducted simultaneously and/or concurrently in one apparatus. They are called steps for descriptive reasons and ease of reference.

In certain embodiments, the neutralization bed is filled with 900 g of soda lime and 2.4 L of water and is used to neutralize the reaction vessel effluent when drained during normal operations, at completion of the synthesis run, or to arrest the nitric acid copper reaction in the event of a need for an emergency shutdown.

The reaction can be stopped when the copper has been consumed. Although copper nitrate $[3Cu(NO_3)_2]$, when dried and heated can produce $NO_2$, and increase the effective yield, the copper nitrate can also be discarded as a waste product.

$$2\ Cu(NO_3)_2 \rightarrow 2\ CuO + 4\ NO_2 + O_2 \qquad \text{Equation 5}$$

In a sixth optional and separate step 1006, the $N_2O_4$ is purified by distillation through a molecular sieve bed to further reduce the impurity levels of water and nitric acid. The distillation system can include a combination of distillation, adsorption, and a final distillation step, all in one apparatus. Distillation of the $N_2O_4$ from the synthesis equipment is conducted by vaporizing the liquid $N_2O_4$ in the distillation vessel, after which the vapors move into the distillation tower packed with molecular sieves. The vessel is blanketed with USP oxygen to force the conversion of any NO that may be present to $NO_2$. The molecular sieve adsorbs the water and nitric acid impurities.

The purified $NO_2/N_2O_4$ vapor phase moves from the distillation tower to the cold fingers where it is cooled and allowed to dimerize again to liquid $N_2O_4$. The liquid $N_2O_4$ is allowed to reflux before final collection in a cold Dewar vessel. After collection the distilled material is weighed and molecular sieves can be added to the $N_2O_4$ in the collection vessel for further purification, for example, for at least one day.

Crude $N_2O_4$ is stored over molecular sieve with $O_2$ present. The $O_2$ oxidizes all of the $N_2O_3$ and NO that may have been formed during the storage over molecular sieve, back into $NO_2$ according to equations 4, 6 and 7. Storage over molecular sieve under an oxygen blanket can replace the optional distillation step 1006

$$2N_2O_3 + O_2 \rightarrow 2N_2O_4 \qquad \text{Equation 6}$$

$$N_2O_3 \rightarrow NO + NO_2 \qquad \text{Equation 7}$$

Filling $N_2O_4$ freezes at $-11°$ C. and boils at $+21°$ C. This leaves a narrow $30°$ C. temperature window in which to transfer liquid $N_2O_4$ into glass ampules, and then seal the glass with a hot flame without vaporizing some of the $N_2O_4$ which may interfere with the glass sealing process. Embodiments described herein generally involve the transfer the liquid into the ampule at a temperature between $-10°$ C. and $+5°$ C., and then freezing the liquid $N_2O_4$ in the ampule on liquid nitrogen ($-196°$ C.), before heating the glass with the flame to form the hermetic glass seal.

The filling process is further complicated by the need to minimize moisture condensation inside the ampule while the material is chilled and before the glass is sealed. The absence of moisture is important because some of the $H_2O$ in $N_2O_4$ will convert into nitric acid ($HNO_3$). Because of the need to control the moisture during the filling operation, the analytical methodology for determining impurities is improved by being conducted in the hermetically sealed ampule after the filling and sealing operation.

The introduction of liquid $N_2O_4$ into the ampules (typically approximately 0.5 ml), the cooling of the liquid after filling and then loading the ampules onto a conveyor can be carried out manually in a dry glove box or automatically with production equipment. The $N_2O_4$ is typically kept dry to a dew point of preferably $<-40°$ C. to reduce the formation of nitric acid impurities A commercially available glass filling machine, manufactured by Cozzoli, has been adapted for this use. The entire machine is placed inside a sealed glove box which is flushed with dry air to maintain a $\leq-30°$ C. dew point. The entire box is located inside a floor to ceiling fume hood. The two propane flames used for sealing the glass produce water vapor as the fuel is burned, with one molecule of propane producing 4 molecules of water.

$$C_3H_8 + 5O_2 \rightarrow 3CO_2 + 4H_2O \qquad \text{Equation 8}$$

For this reason the glove box is flushed with dry air that is $<<-20°$ C. dew point in order to maintain the low humidity during the filling operation.

The Cozzoli machine is currently used only for automatically and reproducibly bringing the ampules to the two flame stations, spinning the ampules as the glass melts and the hermetic seal is formed, and then automatically bring them to a location where they can be removed from the machine.

Every sealed ampule is then placed batch wise into an oven that is at a nominal temperature of $70°$ C., a temperature that is significantly in excess of the temperature that it will experience during use. This oven temperature is maintained for >2 hours and is used to stress the hermetic seal on the glass ampule to be sure that it can withstand the thermal stress and a greater overpressure than it is likely to experience during shipment and use. After the burst test is completed, each sealed ampule is analyzed by FTIR spectroscopy to assure that the water, nitric acid and nitric oxide impurities are within specification. With the use of automated filling equipment, it will not be necessary to analyse every ampoule and conventional statistical sampling can be utilized. The ampules are then ready for placement in the stainless steel liquid vessel which is part of the cassette.

Overview of Purity

Methods described herein for producing $N_2O_4$, from NF 70% nitric acid and 99.998% pure copper in an all glass apparatus, ensures that there are a limited number of compounds that can come into contact with product. The only other compounds that come into contact with the reaction are USP oxygen, molecular sieve, glass and limited exposure to the material of a few O-rings. This assures that all organic compounds are absent. Also, all metals are absent except for copper. Indeed, analyses that have been carried out on the final purified liquid $N_2O_4$ confirm that metals, including copper, are not present above the detection limit of 0.3 ppm.

Metals and impurities other than oxides of nitrogen have been investigated in detail. ICP-MS was used to determine all the elements that are present in the copper starting material, as well as in the molecular sieves that are used during purification. Special attention was paid to elements that are of concern for inhalation (PDE) according to ICH Q3D and USP.

The copper starting material contains only six (6) elements, Nickel, Chromium, Silver, Vanadium, Arsenic and Lithium that are on the inhalation list, but all, except for copper, are at levels below the ICH and USP limits. Trace levels of Oxygen, Sulfur, Phosphorous, Silicon and Chlorine, all non-metals, were also found to be present at low levels.

The certificate of analysis of the $HNO_3$ shows that the concentration of heavy metals (calculated for Pb) in the $HNO_3$ are below 2 PPM, the detection limit. As heavy metals the USP consider those that produce colored sulfide compounds, such metals as lead (Pb), mercury (Hg), bismuth (Bi), arsenic (As), antimony (Sb), tin (Sn), cadmium (Cd), silver (Ag), copper (Cu), and molybdenum (Mo). Iron, another heavy metal, are below 0.2 PPM.

The synthesis, purification, filling and storage equipment all use the same materials. All materials were selected to be resistant to $NO_2$, $N_2O_4$ and Nitric Acid.

Glass is used wherever possible. The glass used is Borosilicate Glass. This glass is made of approximate 70-80% silica ($SiO_2$), 7-13% boric oxide ($B_2O_3$), 4-8% alkali oxides (sodium oxide ($Na_2O$); potassium oxide ($K_2O$)), 2-7% aluminum oxide ($Al_2O_3$) and 0-5% earth alkali oxides (calcium oxide (CaO), magnesium oxide (MgO) etc.), though specific compositions and especially trace elements are proprietary and therefore not available. The type of glass used is common in the pharmaceutical industry and approved by USP.

The only impurities that are present are those from the dynamic equilibrium exchange reactions of $N_2O_4$, $NO_2$, NO, $N_2O_3$, $H_2O$, $O_2$, $HNO_3$ and $HNO_2$. The equilibrium reactions are summarized in equations 4, 6, 7, 8 and 9.

$$4NO_2 + O_2 + 2H_2O \rightarrow 4HNO_3 \qquad \text{Equation 9}$$

The presence of water tends to produce some nitric acid ($HNO_3$) and some nitrous acid ($HNO_2$). The equilibrium of equation 4 is temperature dependent with high temperatures in a combustion reaction favoring NO, and ambient temperatures favoring $NO_2$.

Figure 2A:
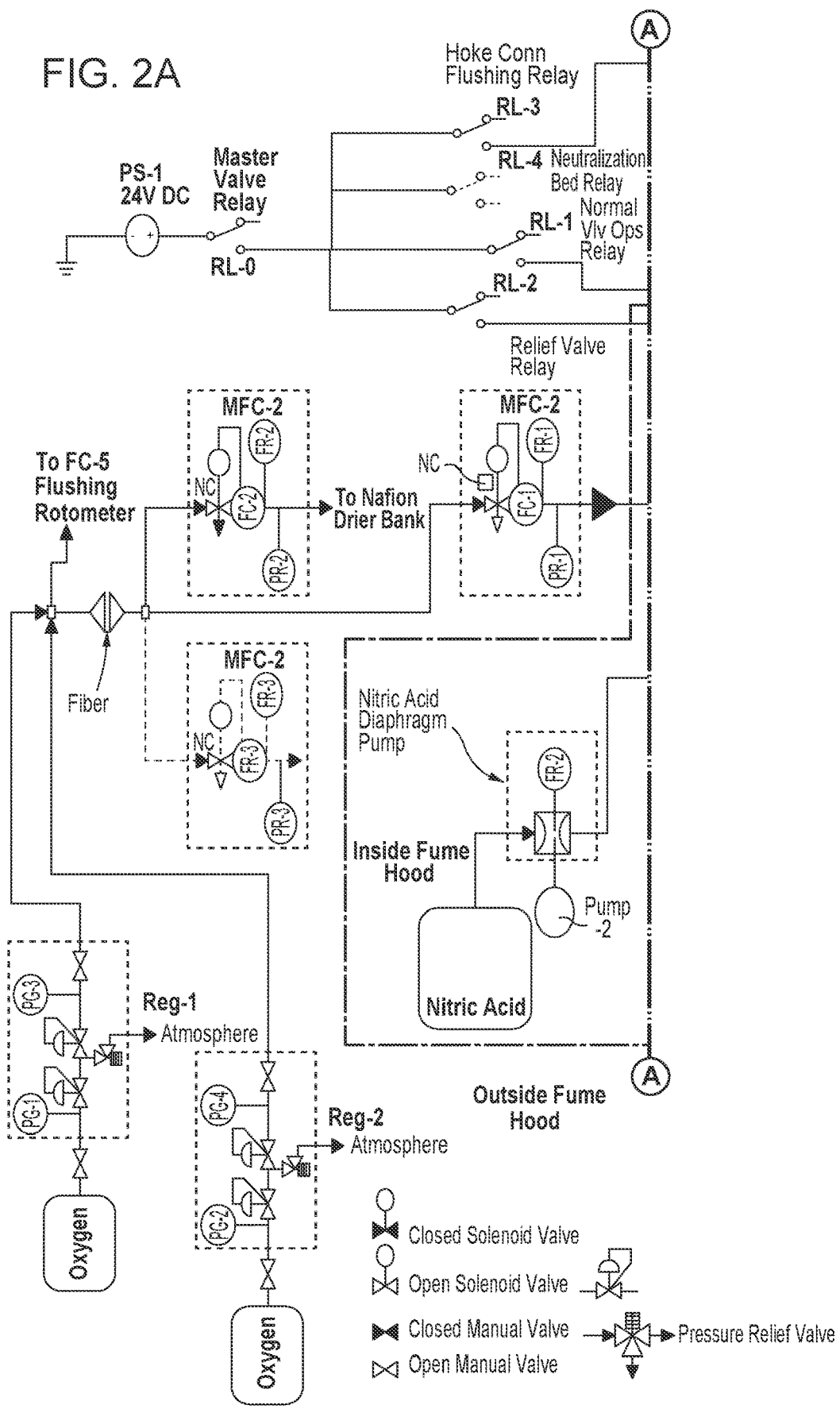
FIGS. 2A-2C is a schematic showing an overview of a process of synthesizing $N_2O_4$, according to an embodiment.
Figure 2B:
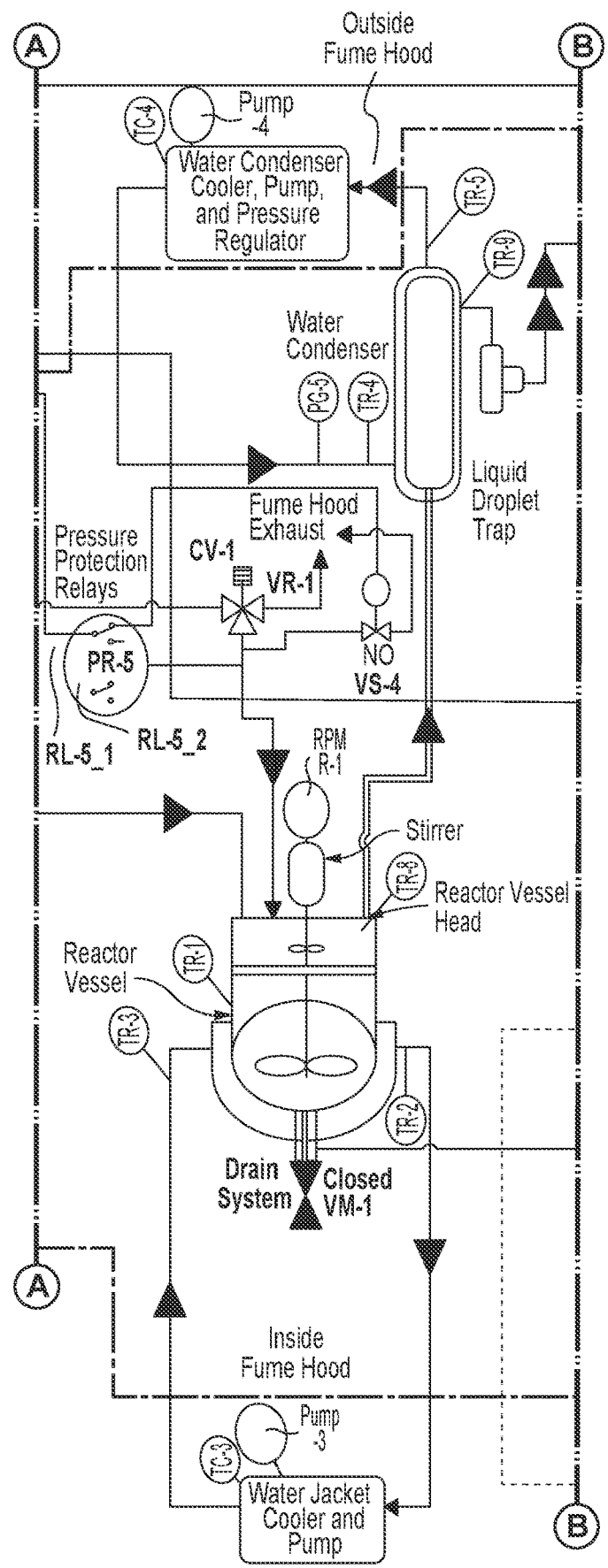
Figure 2C:
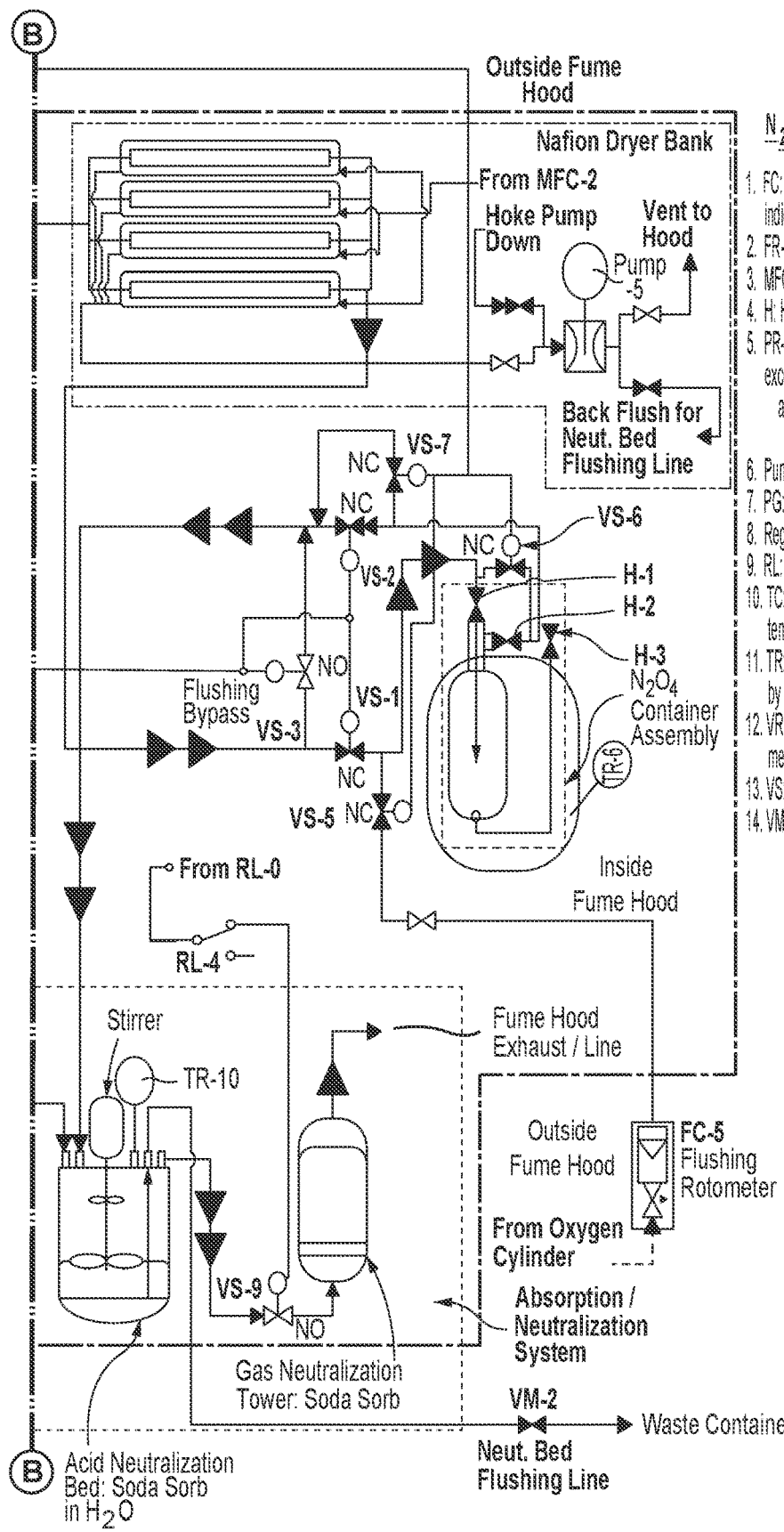

FIGS. 2A-2C depict a schematic illustration of an experimental system for the synthesis of $N_2O_4$ is conducted by mixing nitric acid into a reaction vessel containing copper pellets, where the product of the reaction is $NO_{2(g)}$, according to an embodiment. The $NO_2$ gas desorbs from the reaction slurry along with some nitric acid and water vapor. The gas mixture is combined with a carrier gas, oxygen, transported to a condenser where some of the water and nitric acid, as well as some $NO_2$, are condensed and dripped back into the reaction vessel. The $NO_2$ vapor phase moves through Nafion (or other suitable) dryers where excess water is removed from the gas. The $NO_2$ gas is collected at dry ice temperatures in a glass lined (Silcolloy 1000) stainless steel Hoke® (or other suitable container). The oxygen carrier gas containing some $NO_{2(g)}$ passes through a neutralization bed and scrubber, and the gasses are then vented to a fume hood.

Using a mass flow controller (MFC-1) USP Oxygen is set to flow through the synthesis system is controlled at approximately 1.00 SLPM; it is nominally set at 1.00 SLPM. This flow rate is important, as too low of a flow could reduce the amount of $O_2(g)$ available for the reaction of NO(g) to $NO_2(g)$, which would reduce the yield. Too high of a flow rate will reduce the residence time in the Hoke and negatively impact the yield. The residence time is important as the $NO_2(g)$ should be cooled to form the dimer $N_2O_4(g,l)$ while being condensed and solidified to significantly reduce the vapor pressure. It also appears that the pressure in the system affects the yield. Increasing the pressure appears to lower the yield and it does increase the chances of a system failure due to over pressurization. System pressure is collected from the carrier gas MFC-1 to monitor the pressure build up during the chemical reaction, which typically is 14.2-16.7 PSIA. As a safety precaution, in case of over pressurization, at 4.5 PSIG there is a pressure gauge (PR-5) located near the reaction vessel on the USP oxygen inlet line, the relay (RL-5) built into the pressure gauge (PR-5) will open by cutting power to the relief valve, which is a normally open. The back pressure regulator (VR-1) in the system acts as a mechanical relief valve opening proportionally, when pressure rises above its 4.0-4.2 PSIG set point. The larger the differential pressure above its set point, the greater the proportion the valve is open. The back pressure regulator will reseat near its set point when pressure is relieved.

The synthesis of $N_2O_4$ is conducted by mixing nitric acid into a reaction vessel containing copper pellets, where the product of the reaction is $NO_2(g)$. The $NO_2$ gas desorbs from the reaction slurry along with some nitric acid and water vapor. The gas mixture is combined with a carrier gas, oxygen, transported to a condenser where some of the water and nitric acid, as well as some $NO_2$, are condensed and dripped back into the reaction vessel. The $NO_2$ vapor phase moves through Nafion dryers where excess water is removed from the gas. The $NO_2$ gas is collected at dry ice temperatures in a glass lined (Silcolloy 1000) stainless steel Hoke®. The oxygen carrier gas containing some $NO_{2(g)}$ passes through a neutralization bed and scrubber, and the gasses are then vented to a fume hood.

In certain embodiments, for a manufacturing batch, 250 g of Copper Pellets are added into a 4-liter volume jacketed reaction vessel. The reaction vessel is heated and/or cooled by the reaction vessel heat exchange system to maintain the reaction slurry in the range of 60-85° C. The reaction slurry temperature is monitored by a thermocouple (TR-1) at the bottom of the reaction vessel that is immersed in the slurry. The temperature of the reaction slurry affects the yield. Because the cost of the reagents, copper and nitric acid, are relatively inexpensive as they are standard items of commerce, yield efficiency is not of overriding importance, and can be sacrificed for ease of use, repeatability and simplicity. The higher the temperature the greater the $N_2O_4$ yield; however, the temperature limit is set to 85° C. for safety considerations. The reaction vessel heat exchange system is comprised of tubing, color and gender coded connections (plugs and sockets), thermocouples, and a self-contained recirculating pump (Pump-3) with water heater and cooler designed to maintain a constant flow rate and temperature as defined by the user selected set points. The recirculatory pump is set to "High" and the temperature set point is set for 75° C. to warm the reaction vessel and bring the reaction thermocouple (slurry measurement) in to the specified range. Typically, the recirculator set point does not need adjustment by the operator to maintain the specified temperature range of the reaction slurry. The inlet and outlet temperatures of the recirculatory pump are measured by thermocouples.

In an example, a diaphragm pump (Pump-2) is used to pump 1.2 L of 69-71% nitric acid, grade is NF Nitric Acid, at 50 ml/min into the reaction vessel. The nitric acid is dispensed directly from the original nitric acid container. A piston pump and a peristaltic pump have been shown to work as well, and so was the use of a simple gravity feed. A low acid addition has been shown to reduce the $N_2O_4$ yield for a given amount of copper, while a high addition has been shown to increase yield. The flow rate of nitric acid is specified as it is expected to affect yield. The copper and nitric acid reaction has two path ways for the reaction to proceed through. The concentrated reaction consumes 1 mole of copper to produce 2 moles of $NO_2$. The dilute reaction consumes 3 moles of copper to ultimately produce 2 moles of $NO_2$. The dilute reaction produces NO directly which is further oxidized by oxygen to $NO_2$ where the molar reaction ratio of $NO:NO_2$ is 1:1. The current nitric acid pump has been shown to drift significantly during use, as such the nitric acid bottle is placed on a calibrated scale where every 7 minutes the pump is stopped and the mass of nitric acid added is calculated. Based on this mass measurement, the pump flow rate is adjusted every 7 minutes for 24 minutes to ensure and appropriate amount of nitric acid is added. The greater the concentration of nitric acid the greater the $N_2O_4$ yield.

The copper and the nitric acid react in an exothermic reaction to form $NO_2$ when the nitric acid is concentrated, and NO when the acid is dilute. The reaction itself is a reactive distillation process as a liquid solid slurry reacts to form gaseous nitrogen dioxide and nitric oxide that desorbs, strips, from the slurry. The gaseous $NO_2$ and NO collects above the reaction slurry surface where the carrier gas, USP oxygen, sweeps the $NO_2$ to the condenser column. The reaction is allowed to take place for 60 min, 45 min without any mechanical agitation from the moment nitric acid is added to the system. After 45 min the vigor of the reaction has slowed enough that the reaction vessel stirrer is operated at 75 RPM for the remaining 15 minutes to agitate the remaining reaction materials to ensure complete consumption of the copper.

A mixture of gasses: $NO_2$, NO, $O_2$, $H_2O$, and $HNO_3$, rise from the reaction vessel into the high efficiency condensing column comprising of a single pass, on the process gas side, with a multi-pass coolant path that includes an outer jacket and inner concurrent and counter current flow path. The process gas leaving the condenser column is specified at 10-20° C. and is typically about 15° C. The temperate of the gas leaving the condenser is an important parameter, as design of the condenser promotes the lowering of the gas mixture temperature to a constant level, providing a constant maximum dew point temperature of the $NO_2$, water, and nitric acid to downstream components. The condenser column outlet process gas is an important parameter as the dew point of the gas are relatable to the impurity profile of the $N_2O_4$ collected in the Hoke. To maintain the process gas within its specified range, the coolant temperature and flow rate through the condenser column are controlled. Typically, the set point of the coolant recirculator is set to 15° C. and the flow rate through the condenser column controlled by changing the outlet pressure of the downstream pressure regulator. The downstream pressure regulator is set to maintain a pressure of 28-32 PSIG at the inlet of the condenser column.

The condenser column outlet process gas is an important parameter as the dew point of the gas are relatable to the impurity profile of the $N_2O_4$ collected in the Hoke. To maintain the process gas within its specified range, the coolant temperature and flow rate through the condenser column are controlled. Typically, the set point of the coolant recirculator is set to 15° C. and the flow rate through the condenser column controlled by changing the outlet pressure of the downstream pressure regulator. The downstream pressure regulator is set to maintain a pressure of 28-32 PSIG at the inlet of the condenser column.

Exemplary Driers

In one example, the Nafion dryer bank, consisting of four identical Nafion driers in parallel, is located downstream of the condenser column and water trap. The Nafion dryer bank is used to further purify the $NO_2$ by removing water vapor from the stream. The Nafion drier is a tube in a tube drier utilizing a moisture transfer barrier. The inner tube is made of the Nafion material and is the conduit to contain and transport the process gas, while the outer tube is a conduit to contain and transport the counter-current drying gas, USP Oxygen. The Nafion material transports species across the barrier due to vapor pressure gradients, from highest to lowest, until equilibrium is achieved. As such, to maximize the drying gas capabilities, the process gas and USP oxygen flow counter-current to maximize the concentration gradient. A vacuum pump (Pump-5) is used to further enhance the drying capabilities of the USP Oxygen, by further reducing the water concentration in this drying gas during the drying process. Since vacuum level and flow rate are important, a mass flow controller (MFC-2) is used to control the mass flow rate of USP Oxygen at 1.75 SLPM±0.1 SLPM, drying gas, and to monitor the vacuum level developed by the vacuum pump aimed at <7 psia.

Once the $NO_2$ exits the Nafion dryers, solenoid valves (VS-1, VS-2 and VS-3) are used in order to direct the flow of the $NO_2$. The operator, through DASYLab, controls the positioning of the solenoid valves. Some of the valves are linked and in some cases valves or valve groups are interlocked so that certain flow paths combinations cannot be combined. While most of the solenoid valve operations are by the operator's intervention, the DASYLab sheet has been built with a single override function that is initiated by an over pressure event. If this over pressure event occurs, the DASYLab sheet automatically bypasses the $N_2O_4$ collection Hoke and sends the gas to the neutralization bed and scrubber column. This function also locks the operator out from trying to reinitiate collection of $N_2O_4$. This over pressurization event occurs above the allowable collection pressure. During operation of the solenoid valves, there is a master relay (RL-0) that should be on to provide a complete electrical circuit for the valves. By using specific valve configurations the system can be pressurized for neutralization bed disposal and leak checking, or to flush the system, or to collect $N_2O_4$. During $N_2O_4$ synthesis the master valve relay (RL-0) is set to ready, Normal operations relay (RL-1) is set to $N_2O_4$ For collection, the relief valve relay (RL-2) is closed, the Hoke flush relay (RL-3) is set to $N_2O_4$ collection and the neutralization valve relay (RL-4) is set to open. This configuration will push the $NO_2$ through the Hoke for collection but allow for gas relief in the neutralization bed to avoid pressure build up.

The collection vessel can be all glass or a stainless steel Hoke that is glass coated with Silcolloy 1000™ material that is installed into the synthesis system prior to the copper and nitric acid addition to the system. All glass can reduce leaching of some metals, especially iron (Fe), out of the stainless steel, resulting in contamination with metal salts. The purpose of the Hoke is allow the $NO_2$ (g) to dimerize to form $N_2O_4$(s) by reducing the temperature of the $NO_2$ to below its melting point. The Hoke is cooled by ground dry ice for 10-15 minutes prior to the addition of the nitric acid, so that when $NO_2$ flows through the gas inlet and down the dip tube the gas freezes and collects inside. A thermocouple (TR-6) is inserted into the dry ice as close to the Hoke as possible, measuring the temperature. Dry ice sublimes at $-78.5°$ C. and 1 atm. Dry ice was chosen over liquid nitrogen due to the risk of condensing liquid oxygen from the atmosphere that could lead to an over pressure explosion as the liquid oxygen vaporized. It was also chosen over other coolants as it is a self-regulating coolant as long as there is some dry ice present. The coolant temperature is an important parameter as it combined with heat transfer characteristics and $NO_2$ residence time in the Hoke impact on the efficiency of the system to condense and solidify $NO_2$ in to $N_2O_4$. The range of the coolant is from $-80°$ C. to $-65°$ C. and is measured by thermocouple. Not all of the $NO_2$ in the carrier gas will condense out; this uncondensed $NO_2$ and the carrier gas leave the Hoke through the gas outlet and flow on to the neutralization bed and to the scrubber column.

The neutralization bed is filled with approximately 900 g of soda lime and 2.4 L of water and is used to neutralize the reaction vessel effluent when drained during normal operations, at completion of the synthesis run, or to arrest the nitric acid copper reaction during an emergency shutdown. A thermocouple (TR-10) is located inside the slurry measuring temperature. The neutralization bed stirrer is set to approximately 200 rpm and is used to mix the soda lime into solution with the water as well as the reaction vessel effluent for neutralization. The neutralization bed liquid portion of the slurry is pressure transferred through a dip tube, tubing, and associated manual isolation valve to a waste container when the synthesis has been completed. The pH of the slurry is tested prior to disposal to ensure the reaction has come to completion with a pH>3. The carrier gas and $NO_2$ exit the neutralization bed and enter a scrubbing column prior to disposal. The scrubbing column is attached to the neutralization bed with a solenoid valve in between. The scrubber is filled with approximately 110 g of soda lime, held in place by 0.5 g of glass wool, to reduce the $NO_2$ concentration before it leaves the system to the atmosphere of the fume hood. The scrubbing column solenoid valve (VS-9) can be closed to allow the neutralization bed and system to be pressurized to check for leaks or to flush out the neutralization bed waste slurry. None of the materials in the neutralization bed come in contact with the final $N_2O_4$ that is used to fill the ampules. Its sole purpose is to neutralize the materials used in the $N_2O_4$ production for safe disposal.

All the outputs of the thermocouples in the system are monitored and converted by data acquisition modules and then displayed, corrected for accuracy, and collected by DASYLab. A Data Acquisition (DAQ). Module converts the millivolt (mV) thermocouple signal to a digital signal that is read, displayed, and stored by DASYLab. An additional DAQ converts a signal from DASYLab for operation of its built in relays. DASYLab is also controlling the relays to energize/de-energize valves through operator input, except in one case. In this one case, DASYLab also has the built in functionality to cause the Relief valve (VS-4) to open and to cause the bypass of the collection Hoke, set the system to flush, if pressure exceeds the set point. DASYLab is an icon-based data acquisition, graphics, control, and analysis software program. The designer of the work sheet uses icons to create an application to collect information from the DAQ modules, perform computational functions on the data, including in this case, corrections to the thermocouple readings, display the data to the user, and finally to log the data on a hard drive.

In one example, NF grade 69-71% Nitric acid is used. Copper is available in a variety of forms (foil, pellets, powder, granules, wire, rods and bars, with purity levels ranging from 99.5% to >99.999%, with the cost of the material roughly proportional to the purity. Copper of the highest possible purity is used.

In certain embodiments, the yield can be increased by drying and then heating the $Cu(NO_3)_2$ to 180° C. This process requires a similar $NO_2$ drying and collection process. Alternatively, one can discard the copper nitrate as a waste product.

After the performance of a synthesis run, the Stainless Steel Silcolloy 1000 Coated Double-Ended Sample Cylinder with some wetted PTFE parts, Hoke containing the collected $N_2O_4$ is isolated and capped. The container is then labelled with Batch/Lot Number, Part Number, and Date and stored in a venting cabinet.

Purification Process

Figure 3:
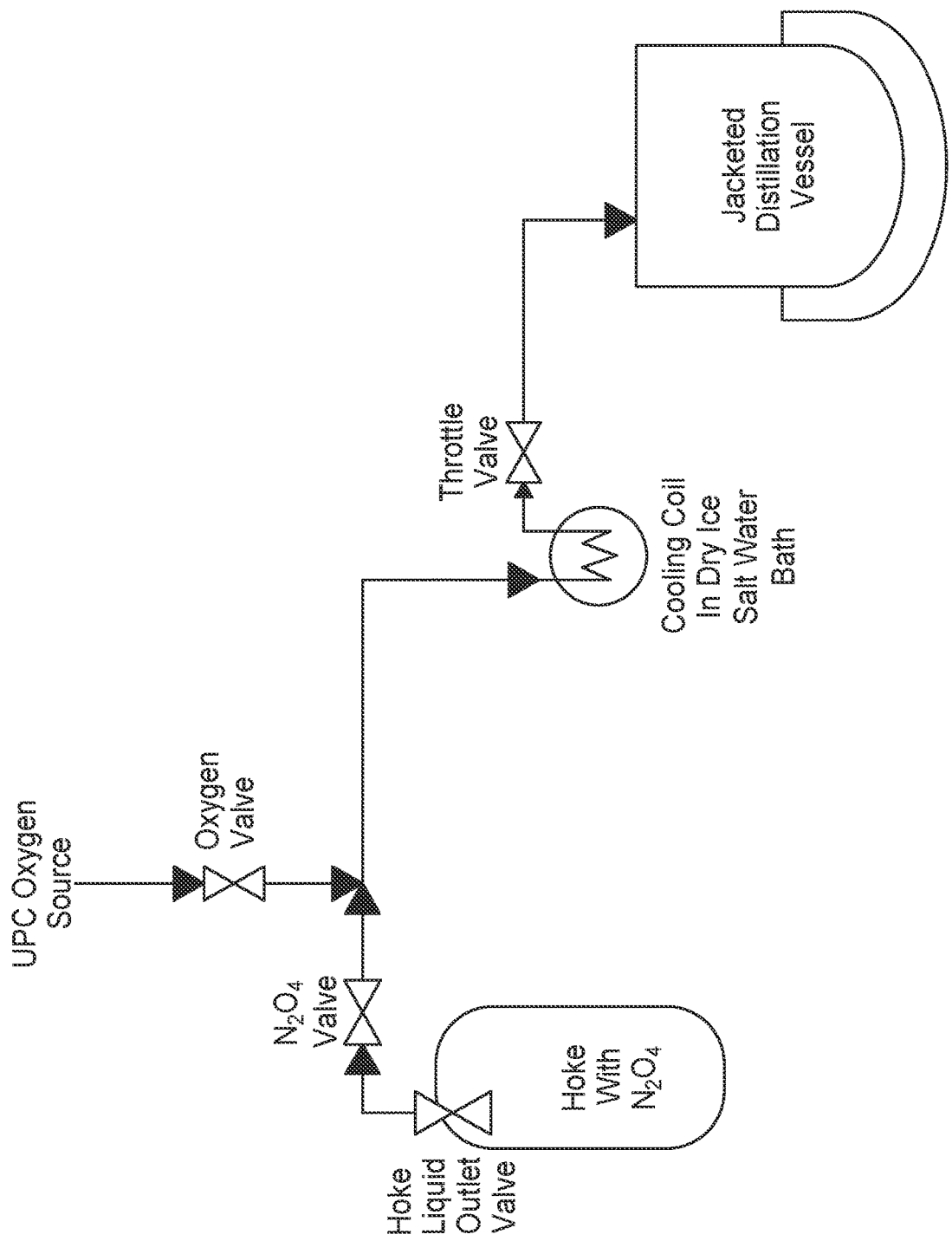
FIG. 3 shows a system for transferring the crude $N_2O_4$ to a distillation system that is used to conduct further purification, according to an embodiment.

The $N_2O_4$ that was collected in the Hoke, can be transferred to a second and separate distillation process. The distillation process is optional and is used when there is insufficient time to wait to allow the $N_2O_4$ in the Hoke to be purified by storage over molecular sieve with an $O_2$ blanket, which can take several days. FIG. 3 is an example of how the material in the Hoke can be transferred to the distillation apparatus using heat and a flow of $O_2$ gas, with no possibility of exposing the crude $N_2O_4$ to moisture in the air. The Hoke is allowed to warm up to above 21° C. so as to vaporize the $N_2O_4$ to form $NO_2$. The $NO_2$ vapor from the $N_2O_4$ is swept by an $O_2$ carrier gas, after which it is cooled in a condenser to reform liquid $N_2O_4$. The liquid $N_2O_4$ is then allowed to flow into a jacketed distillation vessel.

In order to transfer synthesized $N_2O_4$ from the Hoke to the distillation system the $N_2O_4$ should be at above its melting point temperature, but well below the vaporization temperature. A transfer system, as shown in FIG. 3, is attached to the liquid outlet of the Hoke. The system has a total of three valves. One is attached to the liquid outlet of the Hoke, isolating the $N_2O_4$ ($N_2O_4$ valve). The second valve (oxygen valve) is attached to the oxygen source, used to control the USP oxygen flow for pressurizing the Hoke and flushing. The third valve (Throttle valve) is located after a stainless steel coil. This valve is used for opening and closing the system along with controlling the flow rate of the $N_2O_4$. The coil is placed in a salt water bath cooled with dry ice. These three valves are connected by 1/16" ID PTFE tubing. In order to transfer the liquid from the Hoke, the throttle valve should be closed, closing the system. The oxygen valve is then opened with an oxygen flow rate of 1 SLPM, controlled by a mass flow controller. The lines are flushed with Oxygen for 10 min prior to transferring $N_2O_4$. After the flush is complete, the $N_2O_4$ valve and the Hoke liquid outlet valve are then opened to pressurize the Hoke in the range of 45-55 PSIA. Once the Hoke is pressurized the Oxygen valve is closed. To transfer $N_2O_4$ from the Hoke, the tubing attached to outlet of the throttle valve is placed in the distillation vessel and the throttle valve is then throttled open to control the flow rate to maintain the $N_2O_4$ in a subcooled liquid state. This is done to minimize the amount of $N_2O_4$ that flashes off. The transfer is complete when no more liquid $N_2O_4$ is seen coming out. The tubing is removed from the distillation system. The transfer system is then flushed with oxygen to purge any remnant $N_2O_4$ from it prior to storage.

Figure 4:
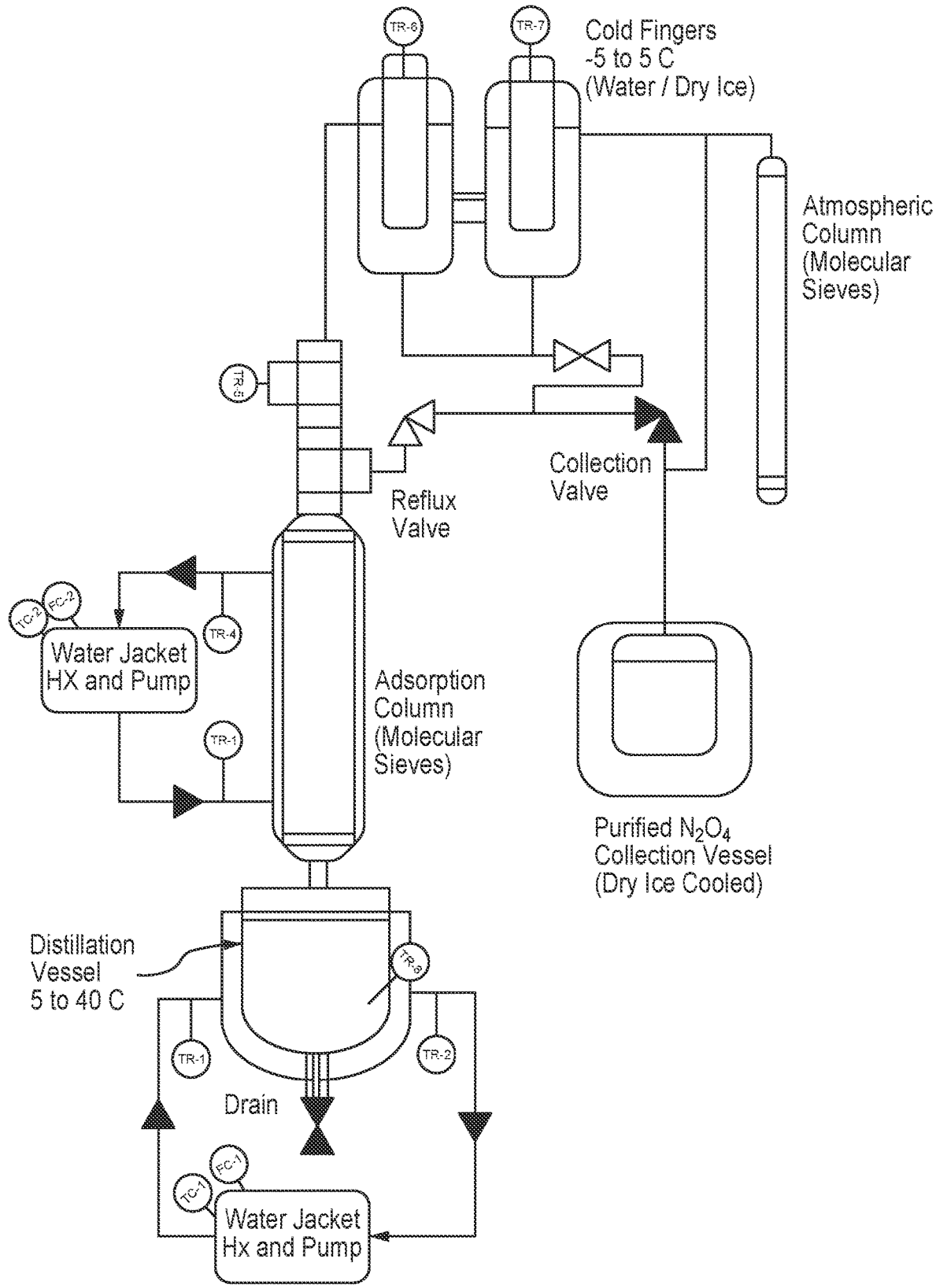
FIG. 4 shows a system for further processing and purification of $N_2O_4$ to remove water and nitric acid, according to an embodiment.

The Distillation System, shown in FIG. 4, is a combination of distillation, adsorption, and a final distillation step in one apparatus. Distillation of $N_2O_4$ is conducted by vaporizing the liquid $N_2O_4$ in the distillation vessel, after which the vapors move in to the distillation tower that is packed with molecular sieve, where the water and nitric acid, as well as some $NO_2/N_2O_4$, are adsorbed on to the molecular sieves. The purified $NO_2/N_2O_4$ vapor phase moves on to the cold fingers where it is condensed back to its now purified liquid form. The liquid $N_2O_4$ is refluxed for a period of time before collection begins. Once collected, the distilled material is weighed and molecular sieves are added to the storage vessel, so as to maintain the purification while in storage.

Using a mass flow controller, USP Oxygen is set to flow through the Distillation system at 5.00 SLPM for 5 min to flush out the air. The synthesized $N_2O4$ that is to be purified is then transferred, via the Hoke $N_2O_4$ transfer apparatus, shown in FIG. 3, into a 1 Liter volume jacketed distillation vessel set to 5° C. The distillation vessel has a thermocouple (TR-8) in the bottom of the vessel measuring the temperature inside. The distillation vessel is heated and/or cooled by the Distillation heat exchange system to vaporize the $N_2O_4$ liquid to $NO_2/N_2O_4$ gas and drive it toward the adsorption tower for purification. The Distillation Heat Exchange System is comprised of tubing, connections (plugs and sockets), thermocouples, and a self-contained recirculating pump with water heater and cooler designed to maintain a constant flow rate and temperature as defined by the user selected set points. The inlet and outlet temperatures of the recirculator are measured by thermocouples (TR-1 and TR-2). When the $N_2O_4$ is being transferred into the system, the Adsorption column is also set to 5° C. Once the material has been added the distillation vessel and heated to 30° C., allowing the liquid $N_2O_4$ to vaporize into $NO_2$ gas and flow into the adsorption column filled with molecular sieve that is heated to 23° C.

The distillation system is now ready to begin the distillation process.

Referring to FIG. 4, the adsorption column is a water jacketed tower, packed with approximately 125 g of molecular sieves, the molecular sieves adsorb water, nitric acid, and some $N_2O_4$. The adsorption tower is heated and/or cooled by the Adsorption Column Heat Exchange System. The Adsorption Column Heat Exchange System is comprised of tubing, connections, thermocouples, and a self-contained recirculating pump set to "High" with water heater and cooler designed to maintain a constant flow rate and temperature as defined by the user selected temperature set point, typically 20-25° C. to maintain the inlet and outlet of the adsorption column coolant in range. The inlet and outlet temperatures of the adsorption tower recirculator are measured by thermocouples (TR-3 and TR-4). The inlet and outlet temperatures are important, since the temperature of the liquid in the adsorption tower cannot be directly measured at this time. The temperature range for the inlet and outlet is 21.5-23.5° C. At the end of the column is a thermocouple measuring the outlet gas temperature entering the cold fingers.

Two cold fingers are used to condense the $NO_2$ gas that has boiled off from the adsorption column back to $N_2O_4$ in liquid form. The cold fingers are cooled by a water dry ice bath to maintain the temperature above the freezing point of the $N_2O_4$ and below the boiling point −5 to +5° C., and more specifically near the freezing point of water. The temperatures of the cold fingers dry ice water bathes are measured by thermocouples (TR-6 and TR-7), which can prevent the gases from freezing onto the cold fingers and the cold fingers from warming too much leading to $NO_2$ losses out of the atmospheric vent. The liquid formed by the cold fingers will then drip into a tee. Both ends of the tee have a valve to control the path of the liquid. The reflux valve directs the liquid $N_2O_4$ back to the adsorption column for refluxing, and the collection valve to the distillate collection vessel. Initially the collection valve and the reflux valve is open. As the $NO_2$ gas vaporizes from the distillation vessel and the $N_2O_4$ from the cold finger flows into the adsorption column until the liquid level is within the acceptable range, marked by two lines at the top of the adsorption column, 1-3 inches from the top of the adsorption column. Once the Liquid level is in range the $NO_2/N_2O_4$ is allowed to reflux for 60 minutes. The Distillation Vessel recirculator is adjusted in order to maintain the level within range. A temperature increase will increase the level while a temperature decrease will lower the level. After the 60 minutes the reflux valve is closed and the liquid is allowed to build up in the tee, the reflux valve is then opened in order to purge the tee, this step is performed three times total in order to wash the area with purified material to limit carryover of less pure material from the beginning of the process.

After the liquid purging, with the reflux valve closed the collection valve is opened. The purified $N_2O_4$ drains down into the 210 ml glass Distillate collection vessel. The Distillate vessel sits in a bed of crushed dry ice to freeze out the $N_2O_4$ that enters the collection vessel. The distillate collection vessel collects and freezes the $N_2O_4$ that has been purified and acts as the storage vessel. As the $N_2O_4$ is collected the adsorption column liquid level will start to drop. The distillation vessel temperature is raised to maintain the liquid level in range until the temperature reaches 40° C. Once the recirculator set point is set to 40° C. the adsorption liquid level is allowed to drop. Once the liquid level is dropped under the bottom adsorption column line, 2 inches from the bottom of the adsorption column, the collection valve is closed and collection is complete. Once collection is complete the reflux valve is opened. The collected $N_2O_4$ is capped and isolated from the system in order to reach ambient temperature to prevent further condensation of water on the outer glass. The collection vessel is then dried and weighed to determine the final mass. The initial mass of the collection vessel was acquired prior to distillation and the difference in mass is used to determine the amount of $N_2O_4$ collected. The yield is calculated by dividing the mass of purified material over the initial mass of $N_2O_4$ placed in the system. The $N_2O_4$ is chilled and a sample of $N_2O_4$ is then drawn from the collection vessel. The sample mass is determined and subtracted from the mass of $N_2O_4$ collected; it is this final mass that is used to determine the mass of molecular sieves to be added to the purified $N_2O_4$. The mass of molecular sieves is approximately 15%±1.5% of the final $N_2O_4$ mass. The $N_2O_4$ collected is maintained chilled, so that it does not flash off as molecular sieves are added. The container is then capped, labelled, and stored in a secondary protective tube prior to being stored in the Acid cabinet for 1-21 days or longer.

The distillate collection vessel is attached to the collection valve and to the junction of the #2 cold finger and vented column, system side, to prevent pressure buildup in the collection vessel. The vented column is attached to the opposite cold finger of the $NO_2$ inlet gas. It is used to maintain the system near atmospheric pressure. The vented column is filled with 20 g of molecular sieves to dry any air that may back flow in to the distillation system.

The outputs for all of the thermocouples are monitored and converted by data acquisition modules and then displayed, corrected for accuracy, and collected by DASYLab. A Data Acquisition (DAQ) Modules converts the millivolt (mV) thermocouple signal to a digital signal that is read, displayed, and stored by DaisyLab. DasyLab is an icon-based data acquisition, graphics, control, and analysis software program. The designer of the work sheet uses icons to create an application to collect information from the DAQ modules, perform computational functions on the data, including in this case, corrections to the thermocouple readings, display the data to the user, and finally to log the data on a hard drive.

After the performance of a Distillation run, the glass tube containing the collected purified $N_2O_4$ is isolated and capped. The inner container consists of a Type 1 glass container with molecular sieves (15+1.5% by $N_2O_4$ mass), capped with a PTFE screw plug that is sealed to the glass container by an FFKM O-ring (Ace Glass 8648-115 or equivalent, with a Parker Ultra Perfluoro elastomer compound FF350 size 212 O-ring or equivalent). The outer container is a stainless steel pipe nipple capped at both ends with stainless steel caps using thread sealant tape. The inner container and outer container are then labeled with Batch/Lot Number, Part Number, and Date and stored in the approved location inside of a vented locked cabinet.

Immediately prior to the filling operation, the $N_2O_4$ is pressurized with 02. This oxidation converts $N_2O_3$ and NO that may have been formed during the storage over molecular sieve, back into $NO_2$ according to equations 4, 6 and 7.

Figure 5:
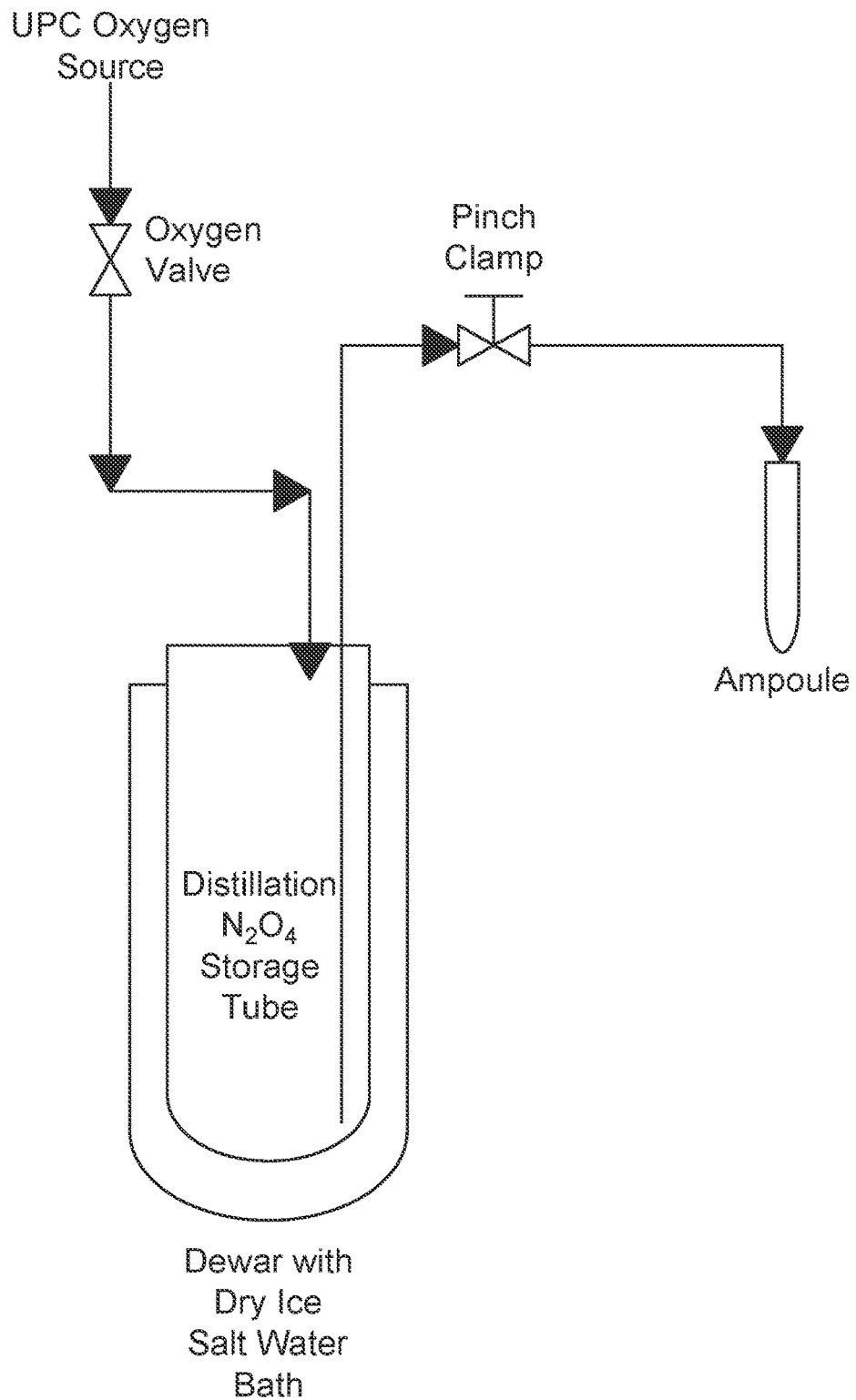
FIG. 5 shows a filling process for introducing liquid $N_2O_4$ into an ampule, according to an embodiment.

The PTFE cap of the purified $N_2O_4$ container is removed and replaced with one containing the $N_2O_4$ transfer/pressurization apparatus. A USP oxygen line with a mass flow controller set at 0.200 SLPM is used to pressurize the $N_2O_4$ to 30-35 PSIA. The container should be pressurized to within this range for sufficient oxygen to be present to oxidize the NO to $NO_2$. Insufficient oxygen pressure may result in some NO not be oxidized to $NO_2$. Over pressurization could lead to a safety issue where the glass container vessel could rupture. Once pressurized, the $N_2O_4$ is moved out of the Dewar and maintained at room temperature for two hours, allowing the oxidation reactions of Equation 4, 6 and 7 to go to completion, converting NO and $N_2O_3$ into $N_2O_4$ Filling Process Referring to FIG. 5, the filling process is performed by introducing liquid $N_2O_4$ into the ampules, followed by the cooling of the liquid to a solid after filling and then loading the ampules onto the conveyor for heat sealing of the glass. Freezing the $N_2O_4$ minimizes $N_2O_4$ and $NO_2$ vapors from interfering with the sealing process. The solid $N_2O_4$ melts at −11° C. and boils at +21° C.; if the $N_2O_4$ reaches a temperature above +21° C. when heat is applied during the glass melting and sealing process, then the pressure inside the ampoule would be greater than atmospheric pressure and the glass seal could be compromised. In addition, in order to prevent moisture from entering the ampoule during the sealing process, the environment surrounding the ampoule should be free of moisture, down to a dew point of preferably <−40° C. The low dew point environment is accomplished by conducting the sealing operation inside a glove box, where ultra-low humidity air is pumped in. A commercial dew point meter is located inside the glove box is used to monitor the moisture level and ensure that the moisture level remains low. The higher the dew point, the more water will find its way into the ampoule, where some of it will react to form $HNO_3$.

In one embodiment, for example, approximately 0.5 ml of liquid $N_2O_4$ can be introduced into the ampules. A commercially available glass filling machine, purchased from Cozzoli, has been adapted for this use. The entire machine is placed inside a sealed glove box which is flushed with dry air to maintain a ≤−40° C. dew point. If the dew point inside the box is not maintained, then additional moisture may find its way into the $N_2O_4$ inside the sealed ampoules. The amount of moisture in the final sealed ampoule is thus a function of the dew point of the sealing process environment. The entire box is located inside a floor to ceiling fume hood. The two propane flames used for sealing the glass, produce water vapor as the fuel is burned, with one molecule of propane producing 4 molecules of water (equation 8). The exhaust from the flames is ducted away from the ampoules. An alternative is to seal the glass with heat produced from a laser or other suitable non-combustion heat source.

In certain embodiments, the Cozzoli machine is used only for automatically and reproducibly bringing the ampules to the two flame stations, spinning the ampules as the glass melts and the hermetic seal is formed, and then automatically removing them from the machine.

Approximately 0.5 ml of liquid $N_2O_4$ is placed into the small glass ampules. The $N_2O_4$ used in the filling system is the $N_2O_4$ that has been purified either by storage for several days over molecular sieves under a blanket of $O_2$, or the material from the distillation system, as described above. The basic steps to filling the ampoules are as follows: a clean dry and preferable chilled ampoule is placed in a holder block with fill level indicators, the ampoule is filled and then removed from the guide, and then immersed in liquid nitrogen to freeze the $N_2O_4$ to preferably −196° C., though other cold temperatures can also work as long as the ampoule glass seal can be obtained. The glass ampule, with the solidified $N_2O_4$, is loaded onto the conveyor and the glass is flame sealed automatically with the Cozzoli or an equivalent machine.

The $N_2O_4$ fill and seal process is housed inside a dry glove box, and the entire structure is housed inside a walk-in fume hood. In one embodiment, two operators stand outside the fume hood and control the $N_2O_4$ fill and seal process using gloves built into the chamber. The chamber is maintained below a negative 20° C. dew point by flushing it continuously with dry air that is below a negative 40° C. dew point at a rate of 9-11 CFM. The dew point and flow rate are used to control the amount of water vapor inside the chamber. By reducing the water vapor surrounding the $N_2O_4$ fill and seal process, it reduces the amount of $H_2O$ that may condense inside the ampule during the filling process, as well as the subsequent chemical reaction that converts some of the $H_2O$ into $HNO_3$.

In one embodiment, purified $N_2O_4$, contained in a glass tube with a PTFE cap and FFKM O-ring seal, from the oxygen pressurization system is placed inside a Dewar cooled with salt water/dry ice for the cooling medium. A thermometer is used to monitor the temperature of the salt water solution. The temperature parameters of the cooling bath are −10° C. to +5° C., the lower limit to prevent freezing and the upper limit to provide sufficient sub cooling of the liquid for dispensing.

After further purification is performed through the oxygen pressurization of the $N_2O_4$, it is then placed back in Dewar to be cooled, so that the $N_2O_4$ will flow out of the container and into the ampoule with minimal vaporization of the $N_2O_4$. A pinch clamp, on the $N_2O_4$ transfer/pressurization apparatus, is used to control the flow of $N_2O_4$ during the manual filling process and to act as an isolation valve. After the pinch clamp at the end of the tubing is an ampule guide used to guide the tubing into the ampule ensuring $N_2O_4$ does not touch the inside wall. When the operator is ready to fill an ampoule, the operator places the ampoule in the fill holder which indicates the minimum and maximum fill lines for the ampoule. The ampule is then removed from the fill holder and is placed in a beaker of liquid nitrogen, where it cools down to −196° C. for solidification. Solidification of the $N_2O_4$ is important, as the vapor pressure in the liquid state causes the ampoules seal to rupture or fail to close during the sealing process. The solidification in liquid nitrogen cools the solid further reducing its vapor pressure and also moving its bulk temperature further away from the melting point.

The ampoule containing the solidified $N_2O_4$ is then placed onto the Cozzoli conveyor for sealing. The Cozzoli is manually started and the conveyor moves the ampule to the preheat flame and then to the sealing flame, spinning the tubes at each station. The ampoule seal is dependent on the temperature of the flame and the speed of the machine. The flame is composed of propane (>99.9% pure) and USP oxygen, both controlled by an individual mass flow controller. The propane is set to 0.175 SLPM 0.018 SLPM and mixes with the oxygen set at 0.900 SLPM. The speed of the machine is adjusted as necessary to manufacturer the seal. A gripper arm grabs the tube near the top open end while the bottom continues to spin. The spinning action causes the glass to constrict and form the seal. The gripper then separates the top of the ampule and discards it to a waste chute. The conveyor moves the sealed ampules forward at which time the Cozzoli is manually stopped. Each ampule is then picked up removed from the conveyor and the seal is visually inspected, and also inspected to assure that the length is between 1.1 to 1.4 inches and a gross visual look of the seal.

For high volume production, the entire manual filling and sealing process can be replaced by an automatic process that would remove all of the manual steps involved. Conventional accurate filling processes can be used. In one example, the fill volume is controlled by the volume of a fill loop, which ensures accurate and reproducible fill volumes. As with the manual process, it can be desirable to fill as a liquid, freeze the liquid to a solid, and then heat seal the glass ampoule. For example, the fill process can include freezing the liquid $N_2O_4$ in a tube, preferably made of glass, of a diameter that is slightly smaller than the internal diameter of the ampoule, and push the frozen $N_2O_4$ out of the tube to form a long cylinder of solid $N_2O_4$. The solid cylinder could be cut to the correct length so as to correspond to 0.5 ml of liquid $N_2O_4$ and then dropped into the ampoule, after which the ampoule would be heat sealed. The advantage of this type of process is that it eliminates the need to have accurate temperature control, as long as the solid cylinder was cold enough.

Every sealed ampule is then placed batch wise into an oven set to 72° C. and tested within a range 69.5-74° C., a temperature that is significantly in excess of the temperature that it will likely experience during use prior to activation. Depending upon the use, higher or lower temperatures may be selected. A probe is placed inside a vial, like the one each individual ampoule is placed in, within the oven. The probe will reflect the temperature seen by the ampoules. The oven temperature is maintained for >2 hours and is used to stress the hermetic glass ampoule to be sure that it can withstand the thermal stress and a greater overpressure (e.g., 110 psia) than it will ever likely experience during use prior to activation. The pressure developed inside the ampoule is primarily due to the partial pressure of the $N_2O_4/NO_2$ vapor, as well as a miniscule contribution from $O_2$ and air, trapped during the sealing process. Since the volume of liquid $N_2O_4$ is sufficiently large, compared to the vapor head, a majority of the $N_2O_4$ remains in liquid form while some of it vaporizes to $N_2O_4/NO_2$ in the gas phase. Since the system contains both liquid and gas, the pressure is determined by the temperature of the bulk liquid $N_2O_4$ when referenced to the liquid-vapor equilibrium curve. At 72° C., the pressure inside the ampoule due to $N_2O_4/NO_2$ gas is approximately 10 psia.

After the burst test is completed, the ampules are sent to the analytical laboratory where they are scanned by Fourier Transform Infra-Red (FTIR) spectroscopy for the presence of trace amounts of water, nitric acid and nitric oxide. As reliability data is generated and analyzed, in may be possible to reduce the need for analyzing each and every ampule by FTIR. Ampoules are randomly selected for additional testing to include: description, ID, assay, fill mass, and ampoule length. After release by the analytical laboratory, the ampoules are released to manufacturing for placement in the stainless steel liquid vessel which is part of the cassette.

Filling Process

As described above, care is taken to prevent moisture from condensing into the cold ampoules and into the liquid $N_2O_4$ during the filling process because any moisture that is present in the $N_2O_4$ converts first to $HNO_3$ at low moisture levels, with some moisture remaining as a water impurity. This the filling environment is typically maintained at a dew point is below −20° C., preferably −40° C. Reducing and/or eliminating moisture contamination is also aided by only exposing the cold $N_2O_4$ to the environment in the filling chamber for a fraction of a second. A dew point monitor can be installed in the filling chamber. A dew point in the filling chamber can be maintained at <−20° C. and preferably less than −40° C. In preferred embodiments, the procedure is automated as much as possible so that the exposure is for less than a fraction of a second. Once liquid is in the ampoule, it should be chilled to liquid nitrogen temperature so as to allow the heat sealing of the ampoule. The use of a laser heat source instead of a flame can be preferred in certain embodiments, because the laser does not produce water vapor like a flame. In certain embodiments, $N_2O_4$ is dispensed precisely as a cold liquid at a temperature just above its freezing point and it freezes solid immediately (e.g., in less than a second) after the liquid is dispensed. Since $N_2O_4$ is a liquid below +21° C. and freezes solid at −11° C., in order to minimize vaporization of $N_2O_4$, the temperature of the liquid can be controlled and maintained between −5° C. and −10° C. Freezing the $N_2O_4$ prior to flame sealing reduces the possibility of $N_2O_4$ vapor compromising the seal.

Preparation and Application of Purity Standards

The compound of interest is Dinitrogen Tetroxide ($N_2O_4$), to which various low level amounts of Water ($H_2O$), Nitric Acid ($HNO_3$) and Nitric Oxide (NO) are added to create impurity standards. The standards are then used to generate calibration curves and conversion factors (CF).

Dinitrogen Tetroxide ($N_2O_4$)

Dinitrogen Tetroxide (CAS-Number: 10544-72-6) has the chemical formula $N_2O_4$ and a molar mass of 92.011 g/mol. It is in a temperature dependent equilibrium with Nitrogen Tetroxide ($NO_2$, CAS-Number: 10102-44-0), a gas:

$$N_2O_4 \rightleftharpoons 2NO_2$$

At room temperature, which is close to the boiling point of 21.69° C., the equilibrium is shifted to the left with most of the $N_2O_4$ being undissociated. At 100° C., the equilibrium is shifted to the right and most is present as gaseous $NO_2$.

At room temperature, $N_2O_4$ is an orange to brownish liquid that turns into a brown gas on evaporation. At temperatures below −11.2° C., the freezing point, it is a clear and colorless solid and looks similar to ice. $N_2O_4$ has a boiling point of 21.69° C. It's density at 21° C., still as liquid, is 1.44246 g/cm³. The material does not dissolve in water, and instead it reacts with water. The refractive index $n_D$ is 1.00112. $N_2O_4$ is highly volatile and has a vapor pressure of 96 kPa at 20° C.

It is highly toxic due to the dissociation into $NO_2$. The OSHA Permissible Exposure Limit (PEL) is 5 ppm (1 ppm is equivalent to 1.88 microgram/m³). $NO_2$ reacts with moisture on the skin and in the lung to form nitric acid. $N_2O_4$ itself is highly acidic. Nitric Acid ($HNO_3$).

The reaction product of $N_2O_4$ with water is Nitric Acid (formula: $HNO_3$, CAS-Number: 7697-37-2). Therefore, $HNO_3$ is one of the impurities that is often present in $N_2O_4$ if it is not handled under very dry conditions. The molar mass of $HNO_3$ is 63.01284 g/mol. It is a light-yellow liquid with colorless fumes on exposure to air. The boiling point is 83° C., the melting point is −44° C. It is completely miscible with water. At very high concentrations $HNO_3$ is very hygroscopic. Its density is 1.5129 g/cm³, the refractive index $n_D$ is 1.397 at 16.5° C. and the vapor pressure is 6.3995 kPa at 20° C. The acid is very aggressive, its fumes corrode most metals. Signs of contamination on skin are yellow discolorations from the reaction with certain proteins on the skin.

Water ($H_2O$)

Water is clear and colorless liquid with a boiling point of 100.00° C. and a freezing point of 0.00° C. Its density varies slightly with temperature and is 0.9998396 g/mL at 0° C., 0.9970474 g/mL at 25° C. and 0.961893 g/mL at 95° C. The molar mass is 18.01528 g/mol. It has a refractive index $n_D$ of 1.3330 at 20° C. The vapor pressure is 3.1690 kPa at 25° C. Water reacts with both $N_2O_4$ and $HNO_3$.

Nitric Oxide

Nitric Oxide is colorless gas with the formula NO, CAS-Number 10102-43-9. It has a boiling point of −152° C. and a melting point of −164° C. Its molar mass is 30.01 g/mol, has a density of 1.3402 g/cm-3 and a refractive index $n_D$ of 1.0002697. It is a linear molecule with a free electron in the outer orbital, therefore NO is a stable free radical that is sometimes called the nitrosyl radical. It reacts with an equal part of Nitrogen Dioxide ($NO_2$) to form Dinitrogen Trioxide ($N_2O_3$), a substance that absorbs in the near-infrared spectrum.

Testing for Impurities

The major possible impurities that may be present in $N_2O_4$ are Nitric Acid ($HNO_3$), Water ($H_2O$) and Nitric Oxide (NO). The sources of the impurities are outlined below:

Nitric acid: $HNO_3$ can come from two sources. First, there is the possibility of carryover of $HNO_3$ that is used in the synthesis from copper and $HNO_3$. The $HNO_3$ carryover is removed by storage over molecular sieve. Second, whenever water is present in the $N_2O_4$, some of the water is converted into $HNO_3$. A small amount of water is carryover during the synthesis process and a small amount may be introduced during the filling and sealing process of the $N_2O_4$ ampoule. Nitric acid is detected by FTIR at 6800 cm⁻¹.

Water: A small water impurity can come from three sources. First, is water carryover from the synthesis where water is present in the nitric acid reagent. Most of this source of water is removed as part of the synthesis process by passing the gases through Nafion tubing and subsequent storage of the liquid over molecular sieve. Second, water can get into the cuvette preparation of the standards from the humidity in the room. Great care needs to be taken to minimize this source of moisture. The third means is during the filling and sealing process. The filling and sealing processes are carried out in a humidity controlled environment to minimize the amount of water introduced in to the product. Water is detected by FTIR at 7118 cm⁻¹.

Nitric oxide: Some NO is formed during the synthesis from copper and nitric acid, but it should be converted into $NO_2$ by means of the $O_2$ flush gas that is used during the synthesis process. Second, NO can form when the $N_2O_4$ is stored over molecular sieve. Again, it should be converted back into $NO_2$ (and then $N_2O_4$) by the presence of added $O_2$ prior to the filling of ampoules. NO is not formed during the filling of the cuvettes or the ampoules. Nitric oxide, when present in the $N_2O_4$, reacts with $NO_2$ to form $N_2O_3$. The $N_2O_3$ is detected by FTIR at 3080 cm⁻¹.

The reaction of traces of water in pure $N_2O_4$ complicates the calibration process and leads to non-linearity of the $HNO_3$ calibration curve. Therefore, the calibration process order should be as follows:

$HNO_3$ additions to pure $N_2O_4$ are used to generate a $HNO_3$ impurity calibration graph with no water present.

$H_2O$ additions to pure $N_2O_4$ are used to generate a tentative $H_2O$ calibration curve. The IR spectra also shows peaks for $HNO_3$ when only $H_2O$ is added. The amount of $HNO_3$ formed from the water is quantitated from the $HNO_3$ calibration graph, and converted into $H_2O$-equivalents.

The water impurity calibration curve is then corrected for the $H_2O$-equivalents.

The amount of $H_2O$ converted into $HNO_3$ is greatest at low moisture levels and then is reduced as the water contamination is reduced.

Removing Impurities

In this context, impurities can refer to anything else other than $N_2O_4$. This includes, but is not limited to by-products, intermediates, degradation products, and impurities that could come from the hardware. Since the purpose is to deliver nitric oxide, a breathable gas, the focus will be on inhalation. Table 1 shows the metals and the impurities levels that are of concern for inhalation (PDE) according to ICH Q3D and USP. The three columns on the right show a worst case correlation with four (4) times more $N_2O_4$ than is present in a single cassette.

TABLE 1

Metal impurities levels that are allowed for inhalation (PDE) according to ICH Q3D and USP

| | | | Metal Impurity Levels for Inhalation | | | | |
|---|---|---|---|---|---|---|---|
| | | | | | using 4 ampoules per day: 2 mL | | |
| | Element | | max. Quantity allowed | | 2 mL = 2.885 g | per ampoule = 0.5 mL | |
| Atom # | Symbol | Name | µg/day | g/day | g/1 g | g/0.72 g | ppm |
| 47 | Ag | Silver | 6.9 | 0.00000690 | 0.00000239 | 0.00000120 | 1.2 |
| 33 | As | Arsenic | 1.5 | 0.00000150 | 0.00000052 | 0.00000026 | 0.3 |
| 79 | Au | Gold | 1.3 | 0.00000130 | 0.00000045 | 0.00000023 | 0.2 |
| 56 | Ba | Barium | 340.0 | 0.00034000 | 0.00011785 | 0.00005893 | 58.9 |
| 48 | Cd | Cadmium | 1.5 | 0.00000150 | 0.00000052 | 0.00000026 | 0.3 |
| 27 | Co | Cobalt | 5.0 | 0.00000500 | 0.00000173 | 0.00000087 | 0.9 |
| 24 | Cr | Chromium | 2.9 | 0.00000290 | 0.00000101 | 0.00000050 | 0.5 |
| 29 | Cu | Copper | 13.0 | 0.00001300 | 0.00000451 | 0.00000225 | 2.3 |
| 80 | Hg | Mercury | 1.2 | 0.00000120 | 0.00000042 | 0.00000021 | 0.2 |
| 77 | Jr | Iridium | 1.4 | 0.00000140 | 0.00000049 | 0.00000024 | 0.2 |
| 3 | Li | Lithium | 25.0 | 0.00002500 | 0.00000867 | 0.00000433 | 4.3 |
| 42 | Mo | Molybdenum | 7.6 | 0.00000760 | 0.00000263 | 0.00000132 | 1.3 |
| 28 | Ni | Nickel | 1.5 | 0.00000150 | 0.00000052 | 0.00000026 | 0.3 |
| 76 | Os | Osmium | 1.4 | 0.00000140 | 0.00000049 | 0.00000024 | 0.2 |
| 82 | Pb | Lead | 5.0 | 0.00000500 | 0.00000173 | 0.00000087 | 0.9 |
| 46 | pd | Palladium | 1.5 | 0.00000150 | 0.00000052 | 0.00000026 | 0.3 |
| 78 | Pt | Platinum | 1.4 | 0.00000140 | 0.00000049 | 0.00000024 | 0.2 |
| 45 | Rh | Rhodium | 1.4 | 0.00000140 | 0.00000049 | 0.00000024 | 0.2 |
| 44 | Ru | Ruthenium | 1.4 | 0.00000140 | 0.00000049 | 0.00000024 | 0.2 |
| 51 | Sb | Antimony | 22.0 | 0.00002200 | 0.00000763 | 0.00000381 | 3.8 |
| 34 | Se | Selenium | 140.0 | 0.00014000 | 0.00004853 | 0.00002426 | 24.3 |
| 50 | Sn | Tin | 64.0 | 0.00006400 | 0.00002218 | 0.00001109 | 11.1 |
| 81 | Tl | Thallium | 69.0 | 0.00006900 | 0.00002392 | 0.00001196 | 12.0 |
| 23 | V | Vanadium | 1.2 | 0.00000120 | 0.00000042 | 0.00000021 | 0.2 |

Copper, together with NF 70% nitric acid are the two starting materials for the production on $N_2O_4$. The copper was analyzed by GD-MS (gas discharge mass spectrometry) and the impurities that were found to be present are shown in Table 2. The elements, which were detected that are on the list of the ICH Q3D and USP for inhalation (PDE) are in bold print. Elements, which could not be detected, are not listed in Table 2.

Besides Copper, only six (6) elements, Nickel, Chromium, Silver, Vanadium, Arsenic and Lithium, are on the inhalation list, but all, except for copper, are at levels below the ICH and USP limits (Table 1). The metal impurities will likely be dissolved in the nitric acid, since nitrates are known to be soluble. These ionic compounds are not likely to be transported further than the condenser. Trace levels of Oxygen, Sulfur, Phosphorous, Silicon and Chlorine, all non-metals, were also found to be present at low levels.

TABLE 2

Metal impurities in a sample of a lot of Copper pellets

| Element | | | Cu-Pellets tested | |
|---|---|---|---|---|
| Atomic # | Symbol | Name | ppm wt | g/g |
| 29 | Cu | Copper | 999982.955 | 0.999982955 |
| 8 | O | Oxygen | 11.00 | 0.000011000 |
| 16 | S | Sulfur | 3.80 | 0.000003800 |
| 26 | Fe | Iron | 1.10 | 0.000001100 |
| 27 | Co | Cobalt | 0.34 | 0.000000340 |
| 28 | Ni | Nickel | 0.26 | 0.000000260 |
| 25 | Mn | Manganese | 0.09 | 0.000000090 |
| 15 | P | Phosphorus | 0.07 | 0.000000070 |
| 13 | Al | Aluminum | 0.06 | 0.000000060 |
| 24 | Cr | Chromium | 0.06 | 0.000000060 |
| 30 | Zn | Zinc | 0.05 | 0.000000050 |
| 47 | Ag | Silver | 0.05 | 0.000000050 |
| 23 | V | Vanadium | 0.03 | 0.000000030 |
| 33 | As | Arsenic | 0.03 | 0.000000030 |
| 20 | Ca | Calcium | 0.02 | 0.000000020 |
| 22 | Ti | Titanium | 0.02 | 0.000000020 |
| 32 | Ge | Germanium | 0.02 | 0.000000020 |
| 74 | W | Tungsten | 0.02 | 0.000000020 |
| 14 | Si | Silicon | 0.009 | 0.000000009 |
| 17 | Cl | Chlorine | 0.009 | 0.000000009 |
| 83 | Bi | Bismuth | 0.004 | 0.000000004 |
| 12 | Mg | Magnesium | 0.002 | 0.000000002 |
| 3 | Li | Lithium | 0.001 | 0.000000001 |
| 92 | U | Uranium | 0.0002 | 0.0000000002 |

Nitric Acid dissolves most metals and transfers them into water-soluble salts. All metal impurities will therefore probably be in the solution and will be transported with the water and acid. Since most water is condensed in the condenser, most metal ions will therefore stay in the main reaction solution. Only water vapor goes beyond the condenser, sometimes carrying with it the Cu-aquo complex [Cu$(H_2O)_6]^{2+}$ as light blue water spots in the water trap. The wet gas is transported then to the Nafion®-driers where most of the water vapor is removed. This reduces the solubility and the transport possibility of the metals, and with this the likelihood that metal ions can get into the storage vessel with the $N_2O_4$ The certificate of analysis of the $HNO_3$ shows that the concentration of heavy metals (calculated for Pb) in the $HNO_3$ is below 2 ppm, the detection limit. As heavy metals the USP consider those that produce colored sulfide compounds, such metals as lead (Pb), mercury (Hg), bismuth (Bi), arsenic (As), antimony (Sb), tin (Sn), cadmium (Cd), silver (Ag), copper (Cu), and molybdenum (Mo). Iron, another heavy metal, is below 0.2 ppm.

Water is a compound that needs to be removed from the final product, because it can form nitric and nitrous acids. The water is removed during the synthesis by passing the wet gas stream over a Nafion®-surface and having dry oxygen at a vacuum on the other side of the Nafion® drier.

Copper Nitrate, $Cu(NO_3)_2$ is the other product of the reaction of nitric acid with copper. It is deep-blue in color which dissolves in the nitric acid, since at the operational temperatures it is completely soluble, and gives it its typical blue color created mainly by the Cu-aquo complex $[Cu(H_2O)_6]^2$ This means that some $Cu(NO_3)_2 \cdot 3H_2O$ would be in the reaction mixture as a solid. This dissolved $Cu(NO_3)_2$ can be transported in the water. This happens in the synthesis through agitation by the reaction (e.g. bubbles, strong mixing), through active mixing at the end of the reaction and through evaporation of the liquid from the exothermic reaction of copper with nitric acid. Most of the liquid in the gas phase is carried by the gas stream to the condenser, where it collects and flows back into the reaction vessel. Only a small amount passes through the condenser and is collected elsewhere, which can be seen by the appearance of a bluish condensate (bluish because of the Cu-aquo complex. A moisture trap shortly after the condenser collects a large amount of the $Cu(NO_3)_2$-carrying moisture. A very small amount is collected further down the line. The gas then passes through the Nafion® counter current drier, which greatly reduces the amount of the water that can carry the dissolved copper. The amount of dissolved metals actually making it to the storage vessel for the $N_2O_4$ is minimal, as shown in Table 3.

Other Copper Compounds are not likely to be created or remain in the reaction mixture since the conditions are very strongly oxidizing. This would lead to the formation of the nitrate, $Cu(NO_3)_2$.

TABLE 3

Metal impurities in a sample of a lot of $N_2O_4$ from the synthesis

| Element | | | $N_2O_4$, from Synthesis | |
|---|---|---|---|---|
| Atomic # | Symbol | Name | ppm wt | g/g |
| 47 | Ag | Silver | <0.3469 | 0.0000003 |
| 33 | As | Arsenic | <0.3469 | 0.0000003 |
| 79 | Au | Gold | <0.3469 | 0.0000003 |
| 56 | Ba | Barium | <0.3469 | 0.0000003 |
| 48 | Cd | Cadmium | <0.3469 | 0.0000003 |
| 27 | Co | Cobalt | <0.3469 | 0.0000003 |
| 24 | Cr | Chromium | <0.3469 | 0.0000003 |
| 29 | Cu | Copper | <0.3469 | 0.0000003 |
| 80 | Hg | Mercury | <0.3469 | 0.0000003 |
| 77 | Ir | Iridium | <0.3469 | 0.0000003 |
| 3 | Li | Lithium | <0.3469 | 0.0000003 |
| 42 | Mo | Molybdenum | <0.3469 | 0.0000003 |
| 28 | Ni | Nickel | <0.3469 | 0.0000003 |
| 76 | Os | Osmium | <0.3469 | 0.0000003 |
| 82 | Pb | Lead | <0.3469 | 0.0000003 |
| 46 | Pd | Palladium | <0.3469 | 0.0000003 |
| 78 | Pt | Platinum | <0.3469 | 0.0000003 |
| 45 | Rh | Rhodium | <0.3469 | 0.0000003 |
| 44 | Ru | Ruthenium | <0.3469 | 0.0000003 |
| 51 | Sb | Antimony | <0.3469 | 0.0000003 |

TABLE 3-continued

Metal impurities in a sample of a lot of $N_2O_4$ from the synthesis

| Element | | | $N_2O_4$, from Synthesis | |
|---|---|---|---|---|
| Atomic # | Symbol | Name | ppm wt | g/g |
| 34 | Se | Selenium | <0.3469 | 0.0000003 |
| 50 | Sn | Tin | <0.3469 | 0.0000003 |
| 81 | Tl | Thallium | <0.3469 | 0.0000003 |
| 23 | V | Vanadium | <0.3469 | 0.0000003 |

The synthetic method chosen to produce $N_2O_4$, from NF 70% nitric acid and 99.995% pure copper in an all glass apparatus, ensures that there are a limited number of compounds that can come into contact with product. The only other compounds that come into contact with the reaction are USP oxygen, molecular sieve, glass and limited exposure to the material of a few O-rings. This assures that all organic compounds are absent. Also, all metals are absent except for copper. Indeed, analyses that have been carried out on the final product synthesized according to methods described herein which confirm this to be the case.

The only impurities that are present are those from the dynamic equilibrium exchange reactions of $N_2O_4$, $NO_2$, NO, $N_2O_3$, $H_2O$, $O_2$, $HNO_3$ and $HNO_2$. The equilibrium reactions are shown in equations 4, 6, 7, 8, and 9.

The presence of water tends to produce nitric acid ($HNO_3$) and some nitrous acid ($HNO_2$). The equilibrium of equation 1 is temperature dependent with high temperatures favoring NO, and ambient temperatures favoring $NO_2$.

Oxygen is used to convert NO to $NO_2$ during the reaction. In certain embodiments, pure oxygen can be used. The $O_2$ that is used is USP-grade material. Certificates of Analysis are available and show that no source of contamination for the drug is introduced into the $N_2O_4$. Even if trace amounts of hydrocarbons would be found in the $O_2$ they would immediately be oxidized to $CO_2$ in the very strongly oxidizing atmosphere of the synthesis system.

In certain embodiments, the $N_2O_4$ is distilled and refluxed over 0.3 nm molecular sieves in a secondary process in order to remove most of the remaining water and nitric acid.

The $N_2O_4$ from the synthesis is refluxed and distilled through a glass column filled with beads of synthetic molecular sieve. The receiving vessel is cooled with dry ice.

Oxygen that is used in the reflux and the distillation step is USP-grade.

Molecular Sieve (also known as "mole sieve") is commonly used to dry liquid and gaseous materials. The material chosen was synthetic and made from silicon (Si), aluminum (Al) and oxygen (O). As counter ions for the resulting negative group they contain ions like sodium ($Na^+$), potassium ($K^+$), calcium ($Ca^{2+}$), magnesium ($Mg^{2+}$) among other ions. Its approximate chemical formula is $\frac{2}{3}K_2O \cdot \frac{1}{3}Na_2O \cdot Al_2O_3 \cdot 2SiO_2 \cdot 9/2H_2O$ with a silica ($SiO_2$) to alumina ($Al_2O_3$) ratio of approximately 2. The molecular sieve, used here has been analyzed several times. A total of 28 elements were detected during those measurements (see Table 4).

TABLE 4

Metal impurities in a sample of a lot of Molecular Sieves

| Element | | | Molecular Sieves tested | |
|---|---|---|---|---|
| Atomic # | Symbol | Name | ppm wt | g/g |
| 13 | Al | Aluminum | 140000 ± 14142 | 0.1400000 |
| 14 | Si | Silicon | 100333 ± 48582 | 0.1003333 |
| 11 | Na | Sodium | 77667 ± 8260 | 0.0776667 |

TABLE 4-continued

Metal impurities in a sample of a lot of Molecular Sieves

| Element | | | Molecular Sieves tested | |
|---|---|---|---|---|
| Atomic # | Symbol | Name | ppm wt | g/g |
| 19 | K | Potassium | 55667 ± 6848 | 0.0556667 |
| 12 | Mg | Magnesium | 10367 ± 1654 | 0.0103667 |
| 15 | P | Phosphorus | 7433 ± 1292 | 0.0074333 |
| 26 | Fe | Iron | 4400 ± 216 | 0.0044000 |
| 20 | Ca | Calcium | 1447 ± 367 | 0.0014467 |
| 22 | Ti | Titanium | 347 ± 130 | 0.0003467 |
| 24 | Cr | Chromium | 77 ± 7 | 0.0000767 |
| 23 | V | Vanadium | 44 ± 2 | 0.0000443 |
| 25 | Mn | Manganese | 32 ± 1 | 0.0000317 |
| 21 | Sc | Scandium | 21 ± 21 | 0.0000213 |
| 56 | Ba | Barium | 21 ± 6 | 0.0000210 |
| 30 | Zn | Zinc | 13 ± 1 | 0.0000130 |
| 40 | Zr | Zirconium | 12 ± 9 | 0.0000117 |
| 29 | Cu | Copper | 9 ± 11 | 0.0000090 |
| 37 | Rb | Rubidium | 7 ± 1 | 0.0000073 |
| 31 | Ga | Gallium | 6 ± 2 | 0.0000063 |
| 38 | Sr | Strontium | 6 ± 1 | 0.0000060 |
| 28 | Ni | Nickel | 5 ± 3 | 0.0000053 |
| 3 | Li | Lithium | 4 ± 2 | 0.0000043 |
| 58 | Ce | Cerium | 4 ± 2 | 0.0000043 |
| 83 | Bi | Bismuth | 4 ± 4 | 0.0000037 |
| 39 | Y | Yttrium | 3 ± 2 | 0.0000033 |
| 5 | B | Boron | 3 ± 0 | 0.0000030 |
| 57 | La | Lanthanum | 3 ± 1 | 0.0000027 |
| 60 | Nd | Neodymium | 2 ± 1 | 0.0000017 |

The synthesis, purification, filling and storage use the same materials: glass, PTFE and PFA, Nafion®, and stainless steel 303 and 304. All materials were selected to be resistant to $NO_2$, $N_2O_4$ and Nitric Acid.

Glass was used wherever possible. The glass used is Borosilicate Glass. This glass is made of approximate 70-80% silica ($SiO_2$), 7-13% boric oxide ($B_2O_3$), 4-8% alkali oxides (sodium oxide ($Na_2O$); potassium oxide ($K_2O$)), 2-7% aluminum oxide ($Al_2O_3$) and 0-5% earth alkali oxides (calcium oxide (CaO), magnesium oxide (MgO) etc.), though specific compositions and especially trace elements are proprietary and therefore not available. The type of glass used is common in the pharmaceutical industry and approved by USP.

The measurement of dinitrogen tetroxide purity can rely on standards. For example, standards can be prepared and used as described here. The preparation and use of Dinitrogen Tetroxide ($N_2O_4$) standards with impurities such as Water ($H_2O$), Nitric Acid ($HNO_3$) and Nitric Oxide (NO) follows. The preparation of the standards can be made in two different vessels, a cuvette and an ampoule. The standards can be used to make a standard curve and the standard curves can be used to determine the concentration of impurities in the $N_2O_4$. The method can be limited to these two vessels which are portrayed in more detail below.

The standards can be used in measuring infrared light in the range of 1282 nm (7800 $cm^{-1}$) and 2857 nm (3500 $cm^{-1}$). This area of the spectrum is considered the Near Infrared (NIR). $N_2O_4$ and the possible impurities $H_2O$, $HNO_3$ and $N_2O_4$ absorb in this range. Analysis can be limited to this part of the spectrum.

In this example, the details are provided for a specific instrument: The IRTracer-100 from Shimadzu. Modifications to the details can be made consistent with the spirit of the disclosure described herein.

The compound of interest is Dinitrogen Tetroxide ($N_2O_4$), to which various low level amounts of Water ($H_2O$), Nitric Acid ($HNO_3$) and Nitric Oxide (NO) are added to create impurity standards. The standards are then used to generate calibration curves and conversion factors (CF).

Preparation of Standards

This section describes the preparation of the calibration standards that are used for the quantitative determination of Nitric Acid ($HNO_3$) and Water ($H_2O$) in Dinitrogen Tetroxide ($N_2O_4$). Nitric Oxide (NO) is introduced as a gas to develop the standards. Standards for the creation of calibration curves for the IR can be created using the common technology of inserting a known amount of compound of interest into a matrix. The matrix should be identical or very close in composition and/or behavior to the real material. The compound of interest should be the identical to the compound in real samples.

Two types of calibration standards are created. The first uses a Near-IR-transparent cuvette with a path length of 10 mm. The second uses a glass ampoule, which is typically round and suitable for storage, shipment, and/or use of liquid $N_2O_4$, for example for use in an ADS cartridge, with a path length of ca. 6 mm, which is equal to the inner diameter of the ampoule. Since the ampoule is curved, a special ampoule holder was manufactured so that only a small portion of the ampoule is open to the IR-light to reduce the effects of difference in path length, bending, reflection etc. The advantage of using the ampoules is that it is the identical container that is used as the final primary package of the $N_2O_4$ API material, and direct analysis of the ampoule includes the possible introduction of water and the formation of nitric acid in the ampoules as used in the clinic.

Cuvette-Standards:

Cuvette-standards can be created just before use. The reason is that a common sealing material (PTFE-Wetted side with backing of silicone) is unstable over $N_2O_4$ for time periods longer than about 24 hours when the seal begins to degrade. The use of the cuvette does not include the filling process, where water could be introduced back into the process. It is to be viewed as useful for "in-process" quality control and does not reflect the purity of the final product in the ampoule.

Pure Dinitrogen Tetroxide (Start of Each Standard Creation):

A clean and dry cuvette is filled with $N_2O_4$ and the cap is placed on the cuvette. For this the cylinder of $N_2O_4$ (Sigma-Aldrich Co. LLC (Guaranteed purity of 99.50% (Minimum) by supplier (Liquid Phase), Product Number: 295582, Batch Number: MKBX0979V, CAS Number: 10102-44-0)) is connected to a stainless-steel flushing tee valve system with a cooling coil and an isolation/flow control valve. From the inverted cylinder liquid $N_2O_4$ standard material flows through a stainless-steel cooling coil and tubing connected to the isolation valve. The cooling coil is placed in a Dewar containing a solution of salt water and ice to cool the liquid $N_2O_4$ to minimize it vaporizing to a gas during the dispensing. Typically, the solution is maintained in a range of −10° C. to −5° C., just above the freezing point of pure $N_2O_4$. As part of the preparation of dispensing $N_2O_4$ from the standard cylinder, the cylinder valve and lines are flushed with $N_2$ gas for approximately 10-15 minutes to remove water vapor. After the nitrogen flush, the system is then filled with the standard $N_2O_4$ and several mL are flushed through the system and directly to SodaSorb for inerting and subsequent disposal. The valve is first opened briefly and the first few mL of $N_2O_4$ are discarded directly into SodaSorb. The nozzle is then wiped clean and the cuvette is filled. The cuvette cap is then placed on the cuvette to avoid moisture condensing into the cold $N_2O_4$. The cuvette with cap and seal is weighed before and after filling. The FTIR-spectra of the pure $N_2O_4$ is then determined as the zero control.

Water Standard:

For the water standard, a small HPLC-vial is filled with clean $H_2O$ (Type I, or better). With a glass syringe (10 μL or 25 μL) used in Gas Chromatography (GC), a predetermined amount of $H_2O$ is taken up and injected into the cold cuvette with the $N_2O_4$. As confirmation of the injection, typically at the injection site in the $N_2O_4$ a green haze from the reaction of $N_2O_4$ with $H_2O$ can be seen. The cuvette is kept cold to reduce the loss of $N_2O_4$ as the syringe needle leaves the septum. The cuvette is brought to room temperature by warming it in the hand. The cuvette is also gently shaken to mix the water with the $N_2O_4$. The cuvette at room temperature is weighed and then placed in the FTIR-spectrometer so as to obtain the spectra. The process is then repeated as many times as needed with the addition of more water each time and the spectra recorded.

One difficulty that has been experienced is that water is colorless and clear liquid and difficult to see in the GC micro-liter syringe. To avoid this difficulty, the syringe can be weighed before and after the addition of the water and the amount of water added determined gravimetrically. This serves only as an indicator of the mass of water in the syringe.

Nitric Acid Standard:

Pure nitric acid (99-100%) is very hygroscopic and since very small amounts of water can be detected, great care must be taken to avoid any introduction of moisture into the acid and therefore into the $N_2O_4$-sample. To avoid this, the nitric acid is placed in a small HPLC-vial with a septum to isolate it from the atmosphere.

A glass syringe is then used to penetrate the septum to extract the $HNO_3$ for injection in to the $N_2O_4$ cuvette. Working quickly and wiping the syringe needle dry before inserting it into the $N_2O_4$-cuvette can reduce the risk of contamination by water. The standard is produced in a similar way to the water standard. A clean and dry cuvette is weighted and filled with fresh and dry $N_2O_4$. After measuring the pure $N_2O_4$ the first aliquot of $HNO_3$ can be determined. As with the water, the procedure is repeated to obtain the calibration graph.

Nitric Oxide Standard

The NO-standards were prepared by introducing NO-gas into $N_2O_4$ and then determining the absorbance of $N_2O_3$, which forms from the reaction of NO with $NO_2$, by means of the IRTracer-100 spectrometer.

The injection of NO was carried out by means of a simple reflux apparatus. Before use, the equipment is thoroughly dried by carefully heating it with a heat-gun under a flow of dry Nitrogen ($N_2$). After the heating is completed, the condenser is cooled to about $-15°$ C. and a cold bath, cooled by solid Carbon Dioxide ("Dry Ice") in a salt solution is used to cool the flask to about $-5°$ C.--$10°$ C. When cold, $N_2O_4$ from the Aldrich lecture bottle is placed in a clean dry bottle. This bottle was weighed empty and then again after the $N_2O_4$ was added, which provides the starting mass of the $N_2O_4$. The bottle is cooled and poured quickly into the flask which is then stoppered.

The apparatus and the $N_2O_4$ is flushed with dry $N_2$ gas through the gas injector so as to drive any $O_2$ out of the system. A sample is then removed and placed in a cuvette (10 mm path length) and the IR spectrum of this NO-free $N_2O_4$ recorded after the measurement the material in the cuvette is returned to the flask.

TABLE 5

Injection of NO into $N_2O_4$ - Time and Concentration

| Concentration [ppm] | Sample No. | Time [min] | Gas |
|---|---|---|---|
| — | 0 | −30 | $N_2$ |
| 0 | 1 | 0 | NO |
| 7.1 | 2 | 30 | NO |
| 14.2 | 3 | 60 | NO |
| 28.8 | 4 | 120 | NO |
| 43.9 | 5 | 180 | NO |
| 51.7 | 6 | 210 | NO |
| 59.5 | 7 | 240 | NO |
| 0 | 8 | 240 | $O_2$ |
| 2347 | 9 | 270 | $O_2$ |
| 3531 | 10 | 285 | $O_2$ |
| 4722 | 11 | 300 | $O_2$ |

The flush gas is then changed to 3000 ppm of NO in $N_2$. This 3000 ppm NO flush gas is injected for the times shown in Table 5, and a sample removed by means of a Pasteur pipette and the sample placed in the cuvette. The FTIR spectrum is then determined and the material in the cuvette is returned to the flask. The flushing with 3000 ppm of NO is allowed to continue for the next time interval and the process repeated.

After 240 minutes, the NO gas is replaced with a dry $O_2$ flush gas and the process is repeated according to Table 5. After 60 minutes of $O_2$ flush gas the equipment is shut down.

Ampoule-Standards:

Ampoule standards that are made up in sealed glass can be kept for long periods of time, and do not have to be freshly made each time. The reason is that the ampoules are filled in a dry environment and sealed in glass. The ampoule-standards are fully protected from moisture and evaporation. It is expected that the standards made in ampoules will last indefinitely, but this will have to be determined by reanalyzing the standards over time so as to ensure that there is no degradation. The calibration curves for the ampoule standards should be identical and should show no variation over time, provided that care has been taken to correct for degradation of the lamps in the spectrometer.

For these standards, the $N_2O_4$ was pure material that was manufactured and purified as described herein, free of all moisture and acid peaks. A different ampoule was used for each concentration, instead of using the same container and adding more and more contaminant ($H_2O$ or $HNO_3$). The make-up of the ampoules is shown in Table 6. Additional ampoules were made with $N_2O_4$ from Sigma-Aldrich Co. LLC, (Sigma-Aldrich Co. LLC (Guaranteed purity of 99.50% (Minimum) by supplier (Liquid Phase), Product Number: 295582, Batch Number: MKBX0979V, CAS Number: 10102-44-0)) was used.

TABLE 6

Concentration of $HNO_3$ and $H_2O$ added to $N_2O_4$ in Ampoules as Nominal Percentages:

| Ampoule No. | $H_2O$ [%$_{Mass}$] | Ampoule No. | $HNO_3$ [%$_{Mass}$] |
|---|---|---|---|
| 1 | 0% | | |
| 2 | 0.05% | 2 | 0.05% |
| 3 | 0.10% | 3 | 0.15% |
| 4 | 0.15% | 4 | 0.25% |
| 5 | 0.20% | 5 | 0.55% |
| 6 | 0.25% | 6 | 0.65% |
| 7 | 0.25% | 7 | 0.75% |
| 8 | 0.50% | 8 | 0.85% |

TABLE 6-continued

Concentration of $HNO_3$ and $H_2O$ added to $N_2O_4$ in Ampoules as Nominal Percentages:

| Ampoule No. | $H_2O$ [%$_{Mass}$] | Ampoule No. | $HNO_3$ [%$_{Mass}$] |
|---|---|---|---|
| 9 | 0.75% | 9 | 0.95% |
|  |  | 10 | 1.25% |

Measurement of the sealed ampoules at GeNO LLC found that the ampoule No. 3 did not contain a water impurity. After an investigation of the method it was found that the micro-liter syringe that was used to dispense the water into the $N_2O_4$-aliquot was not filled with water. Water is a colorless and clear liquid. The syringe body is made from glass, clear and colorless. The work is performed in the dry-box, which limits the view on the materials inside. These points together were determined to be the reason of the missing water in water ampoule No. 3. All other ampoules (pure, with Water, with Nitric Acid) showed no deviation from the expected behavior.

The ampoules are measured in the same manner as with the cuvettes. Since the geometry of ampoule and cuvette is not identical, a special holder was designed and manufactured to consistently hold each ampoule for analysis in the same position as the cuvette.

Figure 6A:
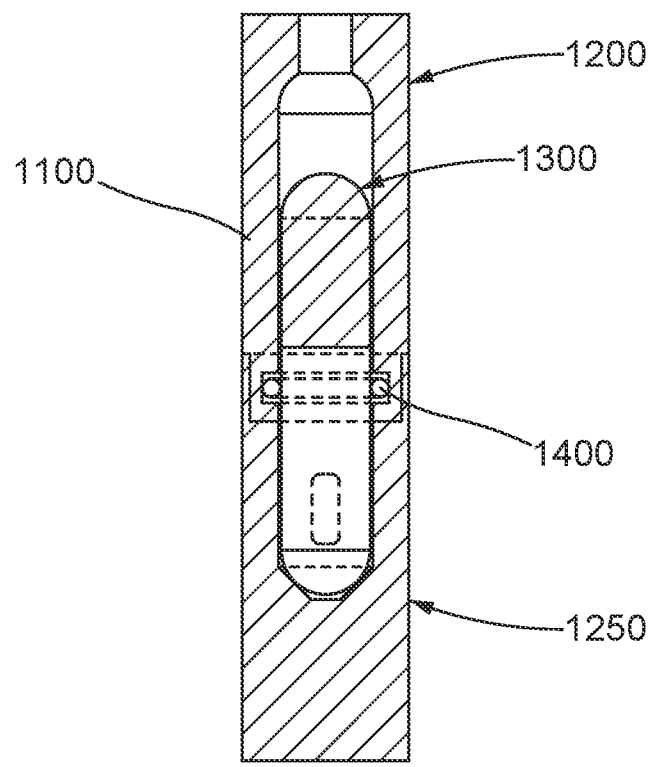
FIGS. 6A-6C depict a cuvette holder, according to an embodiment.
Figure 6B:
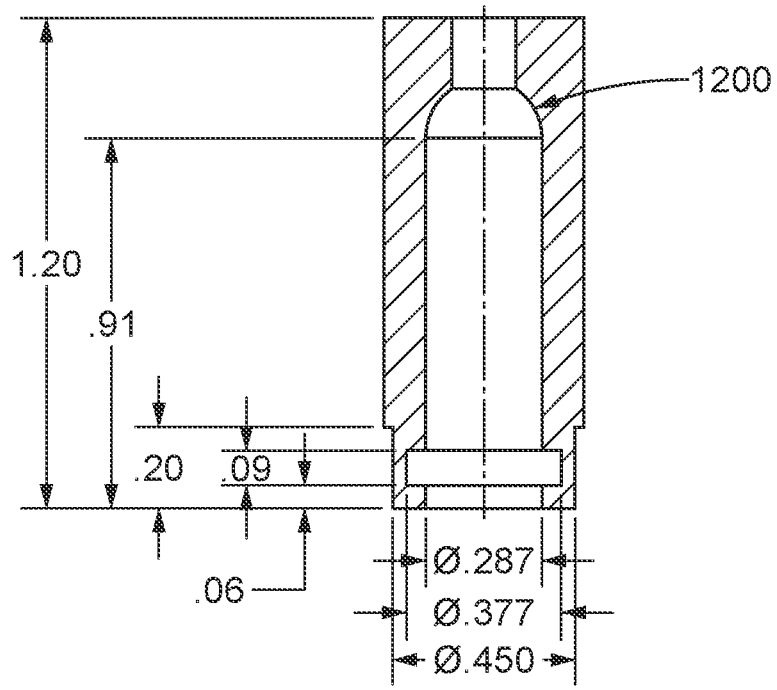
Figure 6C:
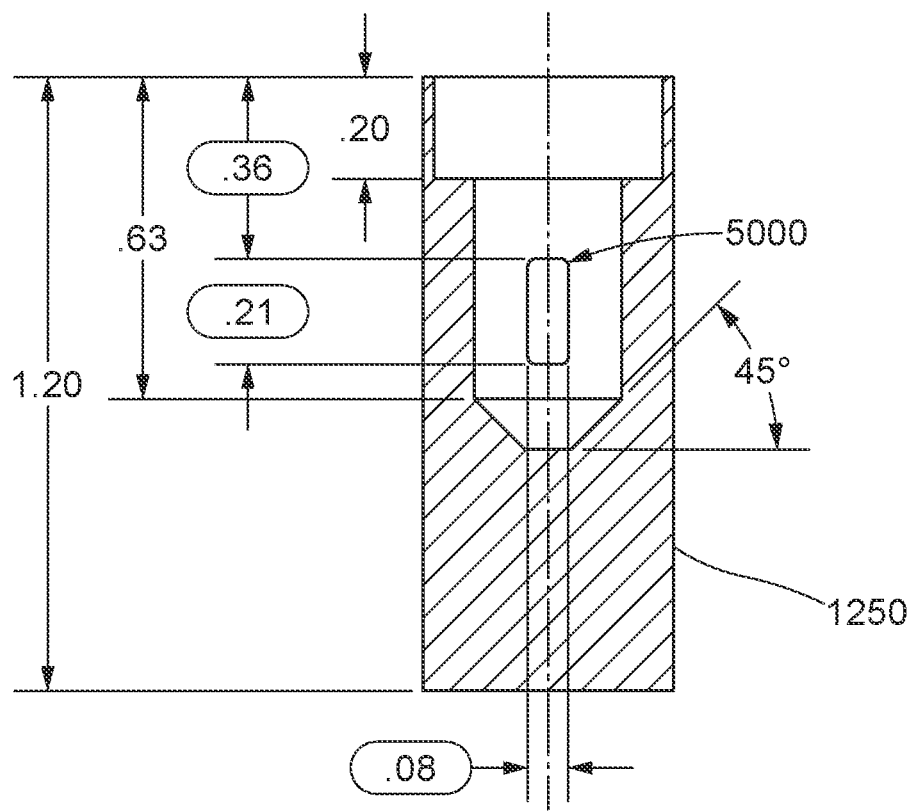

FIGS. 6A-6C depict a design of ampoule holder 1100, which includes base 1250 and top 1200 which hold ampoule 1300 and fit together with o-ring 1400. Referring to FIG. 6C, window 5000 allows for the spectroscopy evaluation of the content of the ampoule.

Creating Standard Curves and Calculating Conversion Factors

For the standard curves different $HNO_3$- and $H_2O$-concentrations were prepared as shown in Table 5. The mass of the empty cuvette was determined at the beginning; the mass of the full cuvette was determined after pure $N_2O_4$ and then after each addition of impurity ($HNO_3$ or $H_2O$). The resulting material was calculated using Equation 10. The amount of added impurity is difference between the mass of material with impurity and mass of material, see Equation 11. The concentration is then the percentage of impurity in the pure material (Equation 12).

$$Cuv_e - Cuv_f = Mat \quad \text{Equation 10}$$

$$Imp_n = Mat_n - Mat_0 \quad \text{Equation 11}$$

$$Conc_n = 100/Mat_0 \cdot Imp_n \quad \text{Equation 12}$$

The spectra of each sample was measured in the FTIR spectrometer, with the temperature of the sample controlled to $-6°$ C. The scan-rate was set to 60, a resolution of 4 cm$^{-1}$ was chosen and the wave-number-range set between 3500 cm$^{-1}$ and 7800 cm$^{-1}$ (typical sample measurement conditions). After each measurement, the next injection of impurity was performed. All spectra and the evaluation results are printed. A pure text-file with the comment line, the wave number and the total counts in that channel was also saved.

TABLE 7.a

Calculation of Concentrations of $HNO_3$ and $H_2O$ added to $N_2O_4$ in Cuvettes as Percentages: HNO3-Addition:

| # | Cuv(emp) g | Cuv(full) g | Material g | Impurity g | Concentration % |
|---|---|---|---|---|---|
| 1 | 8.18514 | 13.55511 | 5.36997 | 0 | 0 |
| 2 | 8.18514 | 13.56648 | 5.38134 | 0.01137 | 0.2117 |
| 3 | 8.18514 | 13.57051 | 5.38537 | 0.01540 | 0.2868 |
| 4 | 8.18514 | 13.58206 | 5.39692 | 0.02695 | 0.5019 |
| 5 | 8.18514 | 13.59301 | 5.40787 | 0.03790 | 0.7058 |
| 6 | 8.18514 | 13.60811 | 5.42297 | 0.05300 | 0.9870 |
| 7 | 8.18514 | 13.63514 | 5.45000 | 0.08003 | 1.4903 |
| 8 | 8.18514 | 13.66162 | 5.47648 | 0.10651 | 1.9834 |
| 9 | 8.18514 | 13.71446 | 5.52932 | 0.15935 | 2.9674 |
| 10 | 8.18514 | 13.74207 | 5.55693 | 0.18696 | 3.4816 |
| 11 | 8.18514 | 13.76603 | 5.58089 | 0.21092 | 3.9278 |

TABLE 7.b

Calculation of Concentrations of $HNO_3$ and $H_2O$ added to $N_2O_4$ in Cuvettes as Percentages: H2O-Addition:

| # | Cuv(emp) g | Cuv(full) g | Material g | Impurity g | 2 % |
|---|---|---|---|---|---|
| 1 | 8.23081 | 14.27948 | 6.04867 | 0 | 0 |
| 2 | 8.23081 | 14.28135 | 6.05054 | 0.00187 | 0.0309 |
| 3 | 8.23081 | 14.28250 | 6.05169 | 0.00302 | 0.0499 |
| 4 | 8.23081 | 14.28384 | 6.05303 | 0.00436 | 0.0721 |
| 5 | 8.23081 | 14.28462 | 6.05381 | 0.00514 | 0.0850 |
| 6 | 8.23081 | 14.28614 | 6.05533 | 0.00666 | 0.1101 |
| 7 | 8.23081 | 14.28770 | 6.05689 | 0.00822 | 0.1359 |
| 8 | 8.23081 | 14.28936 | 6.05855 | 0.00988 | 0.1633 |
| 9 | 8.23081 | 14.29117 | 6.06036 | 0.01169 | 0.1933 |
| 10 | 8.23081 | 14.29367 | 6.06286 | 0.01419 | 0.2346 |
| 11 | 8.41579 | 12.98426 | 4.56847 | 0 | 0 |
| 12 | 8.41579 | 12.98833 | 4.57254 | 0.00407 | 0.0891 |
| 13 | 8.41579 | 12.99018 | 4.57439 | 0.00592 | 0.1296 |
| 14 | 8.41579 | 12.99140 | 4.57561 | 0.00714 | 0.1563 |
| 15 | 8.41579 | 12.99378 | 4.57799 | 0.00952 | 0.2084 |
| 16 | 8.41579 | 12.99581 | 4.58002 | 0.01155 | 0.2528 |
| 17 | 8.41579 | 12.99831 | 4.58252 | 0.01405 | 0.3075 |
| 18 | 8.41579 | 13.00072 | 4.58493 | 0.01646 | 0.3603 |
| 19 | 8.41579 | 13.00141 | 4.58562 | 0.01715 | 0.3754 |
| 20 | 8.41579 | 13.00322 | 4.58743 | 0.01896 | 0.4150 |
| 21 | 8.41579 | 13.00451 | 4.58872 | 0.02025 | 0.4433 |
| 22 | 8.41579 | 13.00565 | 4.58986 | 0.02139 | 0.4682 |

The evaluation of each spectrum was carried out by a computer program as well as by hand. The program LabSolutionIR (by Shimadzu) does correct automatically for the background. For this a "BKG Scan" is performed prior to the start of the measurements with the specific empty cuvette or a representative ampoule in the light path. For the evaluation of a spectrum, first a baseline correction is performed. Then a "PeakPick" is executed. Here an algorithm, part of the LabSolutionsIR-program, tries to fit a function on the different areas of the spectrum. Most of the time the peaks at wave numbers identified as signals for identifying the $N_2O_4$ (Table 7.a) are found. However, the peaks for the low level impurities $H_2O$, $HNO_3$ and NO (Table 7a and 7.b) are seldom found, due to the low signal intensity. If found, that usually means that their concentrations were large. Therefore, for these peaks (7118 cm$^{-1}$, 6800 cm$^{-1}$ and 3676 cm$^{-1}$), a search and peak selection by hand is normally conducted. The procedure starts in the PeakPick-window by picking an area of interest (all values are shown in Table 8.a and 8.b).

TABLE 8.a

Border values for the area ("viewing window")

| Peak of Interest Wavenumber [cm$^{-1}$] | Upper End of Area Wavenumber [cm$^{-1}$] | Lower End of Area Wavenumber [cm$^{-1}$] |
|---|---|---|
| 7118 | 7350 | 6900 |
| 6803 | 7000 | 6400 |
| 3678 | 3900 | 3600 |

TABLE 8.b

Values for peaks of interest

| | Peak of Interest 3678 cm$^{-1}$ | Lowest Point Right Valley | Lowest Point Left Valley |
|---|---|---|---|
| Average Position | 3675.75 cm$^{-1}$ | 3833.04 cm$^{-1}$ | 3645.17 cm$^{-1}$ |
| Standard Deviation Peak Position | 1.02 cm$^{-1}$ | 40.94 cm$^{-1}$ | 16.39 cm$^{-1}$ |
| Minimum Value | 3671.99 cm$^{-1}$ | 3675.85 cm$^{-1}$ | 3604.49 cm$^{-1}$ |
| Maximum Value | 3677.78 cm$^{-1}$ | 3853.28 cm$^{-1}$ | 3670.06 cm$^{-1}$ |
| Delta Minimum/Maximum | 5.79 cm$^{-1}$ | 177.43 cm$^{-1}$ | 65.57 cm$^{-1}$ |
| Span Peak | | 248.79 cm$^{-1}$ | |

| Value | Peak of Interest 6800 cm$^{-1}$ | Lowest Point Right Valley | Lowest Point Left Valley |
|---|---|---|---|
| Average Position | 6800.07 cm$^{-1}$ | 6976.42 cm$^{-1}$ | 6564.80 cm$^{-1}$ |
| Standard Deviation Peak Position | 1.02 cm$^{-1}$ | 18.46 cm$^{-1}$ | 37.90 cm$^{-1}$ |
| Minimum Value | 6796.27 cm$^{-1}$ | 6917.77 cm$^{-1}$ | 6497.34 cm$^{-1}$ |
| Maximum Value | 6802.06 cm$^{-1}$ | 7000.70 cm$^{-1}$ | 6613.06 cm$^{-1}$ |
| Delta Minimum/Maximum | 5.79 cm$^{-1}$ | 82.93 cm$^{-1}$ | 115.72 cm$^{-1}$ |
| Span Peak | | 503.36 cm$^{-1}$ | |

| Value | Peak of Interest 7118 cm$^{-1}$ | Lowest Point Right Valley | Lowest Point Left Valley |
|---|---|---|---|
| Average Position | 7108.66 cm$^{-1}$ | 7338.44 cm$^{-1}$ | 6997.06 cm$^{-1}$ |
| Standard Deviation Peak Position | 7.44 cm$^{-1}$ | 7.57 cm$^{-1}$ | 22.49 cm$^{-1}$ |
| Minimum Value | 7085.56 cm$^{-1}$ | 7299.63 cm$^{-1}$ | 6937.06 cm$^{-1}$ |
| Maximum Value | 7118.34 cm$^{-1}$ | 7349.77 cm$^{-1}$ | 7037.34 cm$^{-1}$ |
| Delta Minimum/Maximum | 32.78 cm$^{-1}$ | 50.14 cm$^{-1}$ | 100.28 cm$^{-1}$ |
| Span Peak | | 412.71 cm$^{-1}$ | |

A mouse click on the right side of the x-axis lets the user input the right window border (as wave number), a click on the left side then the right window border.

Next, the manual peak pick-function is activated by pressing the "3 point" bottom. The region of interest is now selected by moving the left and right red bar to a minimum in the curve on the left and right side of the peak. Likely values are given in Table 8 ("Lowest Point Right/Left Valley"). Lastly the red bar for the peak of interest is moved to the maximum of the peak of interest (values given in Table 4). After all peaks are found and identified (the three impurities H$_2$O, HNO$_3$ and NO plus the typically automatically found peaks for the ID of N$_2$O$_4$), the "OK" button is pressed. This action forces the program to create a peak pick table with the raw and corrected intensity peak heights and associated areas. This is then printed by the operator. The data are also automatically saved by the program. Another peak pick will also be registered with an automatically created new name.

Nitric Acid Standard:

From the print-out the "corrected intensity" ("Cor. Intensity") value for that specific impurity is taken and the value is listed in an Excel data sheet against the corresponding impurity concentration including the pure material measurement. The average corrected intensity of the pure material is subtracted from each value to give the zero-base corrected value. This average zero-base corrected value of each measurement from one impurity is plotted as the y-axis against the corresponding impurity concentration (x-axis). From this plot a linear fit is made and the slope is determined with the condition that the linear fit must go through zero. That condition is justified because if no impurity was injected there should be no signal (=no intensity). So, for no injection there is not a signal, therefore, at zero concentration is zero intensity.

The slope is from the following linear fit equation (Equation 13):

$$y = b \cdot x + a \qquad \text{Equation 13}$$

with: $y$ = corrected intensity (without unit)

$x$ = concentration of impurity (in percent)

$a$ = $y$ − intercept (without unit)

$b$ = slope (1/percent)

Under the condition of a zero intercept (a=0) the equation transforms into $$y = b \cdot x \qquad \text{Equation 14}$$

Since a spectrum delivers corrected intensity values and the concentration of the impurity is wanted, equation 14 is further transformed:

$$y \cdot 1/b = x \qquad \text{Equation 15}$$

The conversion factor (CF) is therefore 1/b with b being the slope.

Water Standard:

The water standard is created in a similar manner to the nitric acid standard and its calculation is similar. But there is a difference that has to be taken into account: When water is mixed with N$_2$O$_4$ in the presence of O$_2$, HNO$_3$ is formed (Equation 16).

2N$_2$O$_4$+2H$_2$O+O$_2$→4HNO$_3$     Equation 16a

The equation can be simplified to:

N$_2$O$_4$+H$_2$O→2HNO$_3$     Equation 16b

The spectrum shows both a nitric acid peak and a water peak. That means that some, but not all of the water is converted into nitric acid according to Equation 16. This converted water has to be taken into account and has to be subtracted from the water that was added by injection to give the "free" water that is found in the spectrum. The determination of the water loss due the conversion to nitric acid is based on the knowledge of the conversion factor for nitric acid that was determined before (see above all that led to Equation 15). Now the corrected intensity at the 6800 cm$^{-1}$ peak is taken and converted into a HNO$_3$-percentage:

%$_{HNO3}$=cor.int.$_{(6800\ cm-1)}$*C$_{FHNO3}$     Equation 17

This percentage of HNO$_3$ is then converted to percent water equivalents by using the fact that the H$_2$O produced two molecules $HNO_3$, which is seven times heavier than the one molecule of water that was used.

$$MM_{HNO3} = 63.01284 \text{ g/mol} \quad \text{Equation 18}$$

$$MM_{H2O} = 18.01528 \text{ g/mol}$$

$$(2 \cdot 63.08412):(1 \cdot 18.01528) = 7.0034:1$$

This means that the percentage Nitric Acid has to be divided by the factor seven. The resulting percentage water will then be subtracted from the percentage of water that was injected.

$$\%_{FREE-H2O} = \%_{H2O\text{-}injected} - (\%_{HNO3}/7) \quad \text{Equation 19}$$

Again, first the mean % FREE-$H_2O$ of the pure $N_2O_4$ will be subtracted from every value of % FREE-$H_2O$ and then the mean value of this reduced "free" water percentage is calculated. This value will now be the new percentage of water and will be used as x-value in the plot for the linear fit and slope.

The registered value from the spectrum for water (corrected intensity at ca. 7118 $cm^{-1}$) needs also be corrected. Because of the shift of the percentages of water due to the loss of water to the formation of nitric acid, the y-intercept is now not zero but a small positive value. Water is already in the system. To compensate for this, the y-intercept is found by placing the best linear fit onto the data points of water (%$_{FREE-H2O}$ on x-axis and Cor. Intensity on y-axis) and reading the y-intercept. The determination of the y-intercept can also be done mathematically (in the Excel-data sheet, each calculation a separate column):

List x-values (%$_{FREE-H2O}$=X) and y-values (Cor. Intensity=D), then:
1. Calculate the mean value for each (meanX, meanD)
2. Subtract from each X- and D-value the corresponding mean value (X−meanX; D−meanD)
3. Calculate the product of these differences ((X−meanX)·(D−meanD)). Calculate the squares of each of these differences ((X−meanX)$^2$; (D−meanD)$^2$)
4. Sum up all the values for the product of the these differences (Sum(X−meanX)·(D−meanD))
5. Sum up all the values for the square of the x−value difference (Sum((X −meanX)$^2$)
6. Calculate the slope: b=(Sum((X−meanX)*(y−meanY))/(Sum((X−meanX)$^2$))
7. Calculate the y-intercept with the condition the x=0: a=((meanY)−(b·(meanX)))

Subtract the value of the y-intercept (a) from the corrected intensity read from the printouts of the spectra. The resulting intensity value is plotted as the y-value, while the corrected FREE-water percentage is the corresponding x-value.

After the reduced corrected intensity versus the FREE-water percentage is plotted, a linear fit is applied to these data. The linear fit is again forced through zero for the same reason as above for the Nitric Acid. The inverse value of the slope is reported as the Conversion Factor (CF$_{H2O}$) for the water concentration determination in samples. This gives a percentage concentration.

Ampoule Standard Curves:

The ampoule standard curves are produced in the same manner as described above. Here the sensitivity is less than for the cuvettes due to the fact a smaller beam width is used because of the curvature of the ampoule. Rather a small beam of 2 mm width passes through the sample. Therefore, especially for the very small amounts of water in the samples the determination of the water peak at 7118 $cm^{-1}$ is less sensitive.

Calibration Factors

The results of the creation of the standard curves and the final Conversion Factors are shown in Table 9. FIGS. 7-11 show the results of the measurements described above. The concentration of the impurity is plotted on the x-axis while the y-axis shows the corresponding corrected intensity.

TABLE 9

Conversion Factors for the determination of Concentrations of $HNO_3$ and $H_2O$ added to $N_2O_4$ in Cuvettes as well in Ampoules: CAUTION: For $HNO_3$ as an impurity the Conversion Factor depends on the amount of the impurity.

| Container | Cuvette | |
|---|---|---|
| Impurity | $HNO_3$ | $H_2O$ |
| Slope | Region 1:<br>0.0%-1.0% $HNO_3$<br>0.183%$^{-1}$ | 0.7726%$^{-1}$ |
| Conversion Factor*<br>Linear Fit Equation | Y · 5.4645%<br>Region 2:<br>1.0%-4.0% $HNO_3$<br>y = 0.0996%$^{-1}$ · x 0.0855) | |
| Conversion Factor*<br>Impurity<br>Slope | ((y − 0.0855)/0.0996)%<br>NO<br>0 ppm-60 ppm NO<br>0.0113 ppm$^{-1}$ | |
| Conversion Factor* | Y · 88.5 ppm | |

| Container | Ampoule | |
|---|---|---|
| Impurity | $HNO_3$ | $H_2O$ |
| Slope | 0.1235%$^{-1}$ | 0.3417%$^{-1}$ |
| Conversion Factor* | Y · 8.0972% | Y · 2.9265% |

*Y is the measured corrected intensity and is dimensionless

Figure 7:
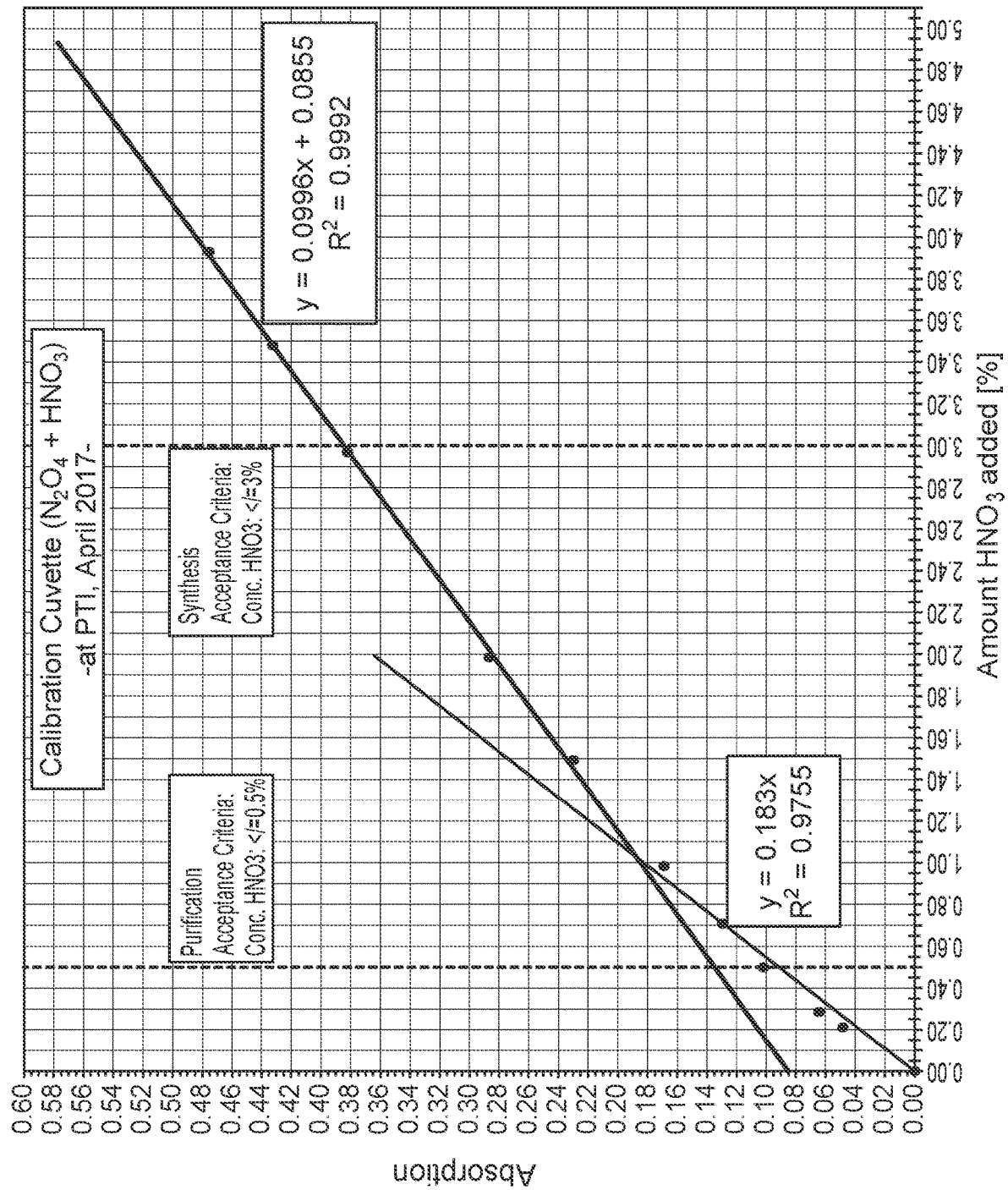
FIG. 7 depicts an example calibration curve for the addition of $HNO_3$ to $N_2O_4$ in a cuvette.
Figure 8:
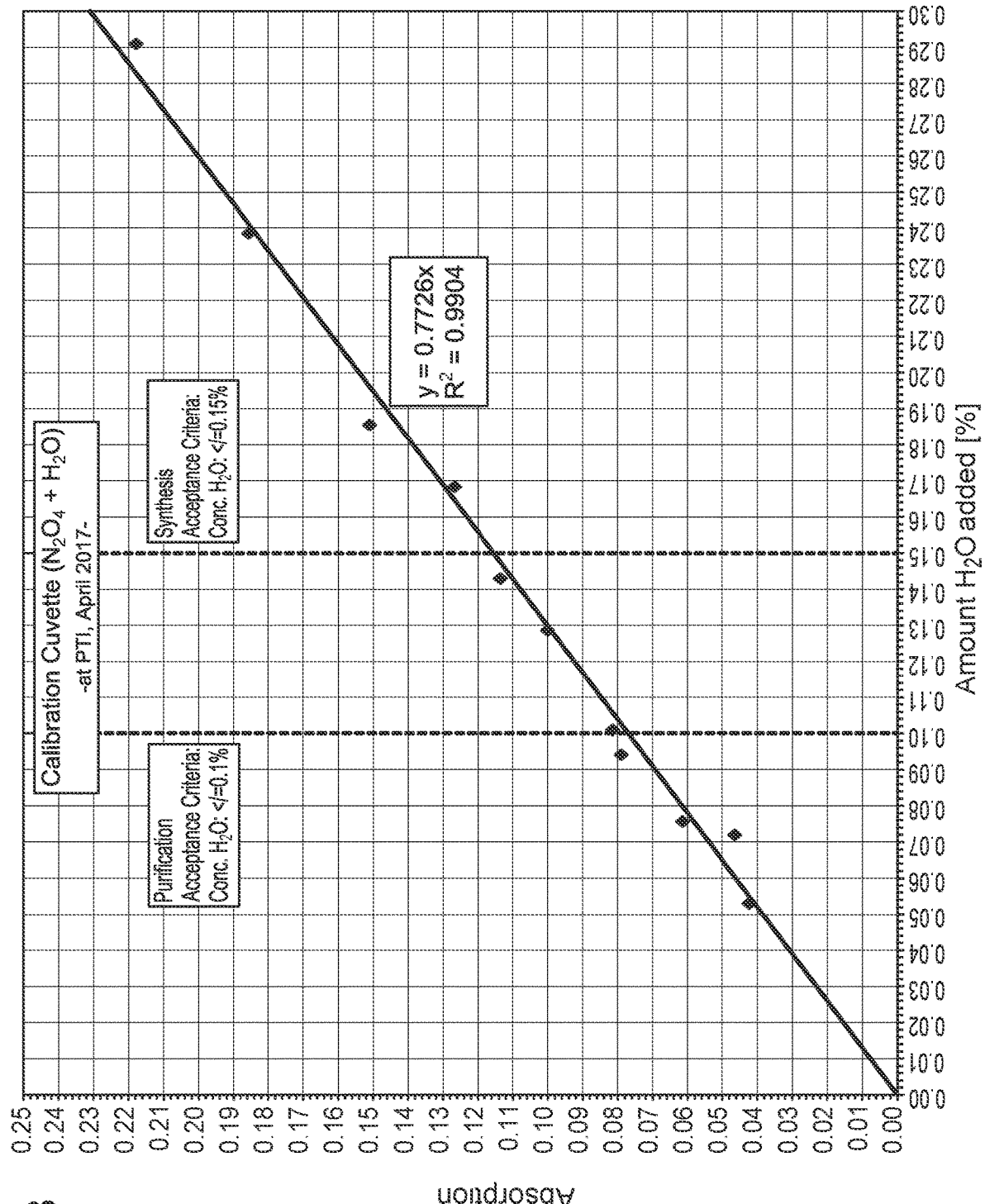
FIG. 8 depicts an example calibration curve for the addition of $H_2O$ to $N_2O_4$ in a cuvette.
Figure 9:
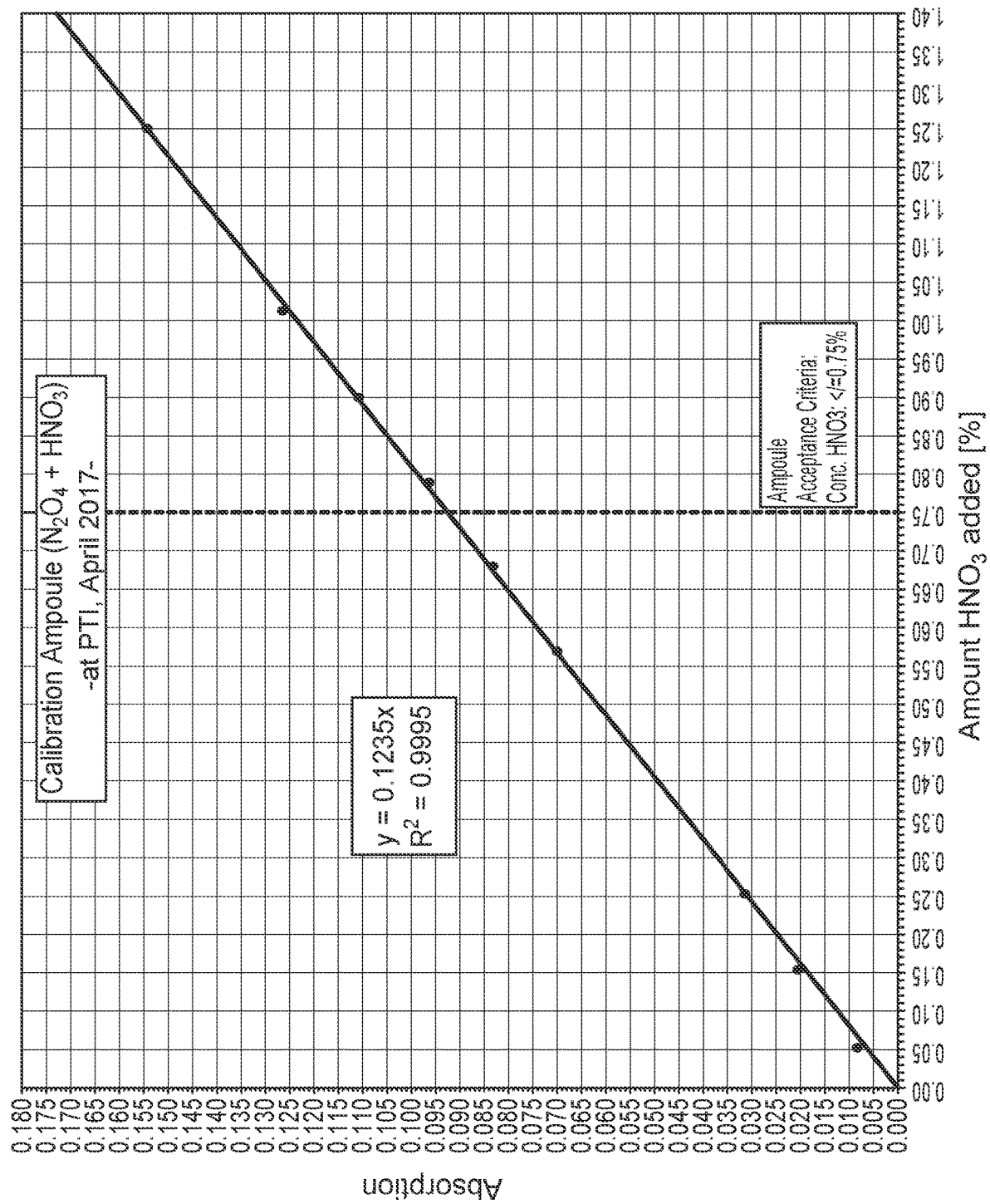
FIG. 9 depicts an example calibration curve for the addition of $HNO_3$ to $N_2O_4$ in an ampoule.
Figure 10:
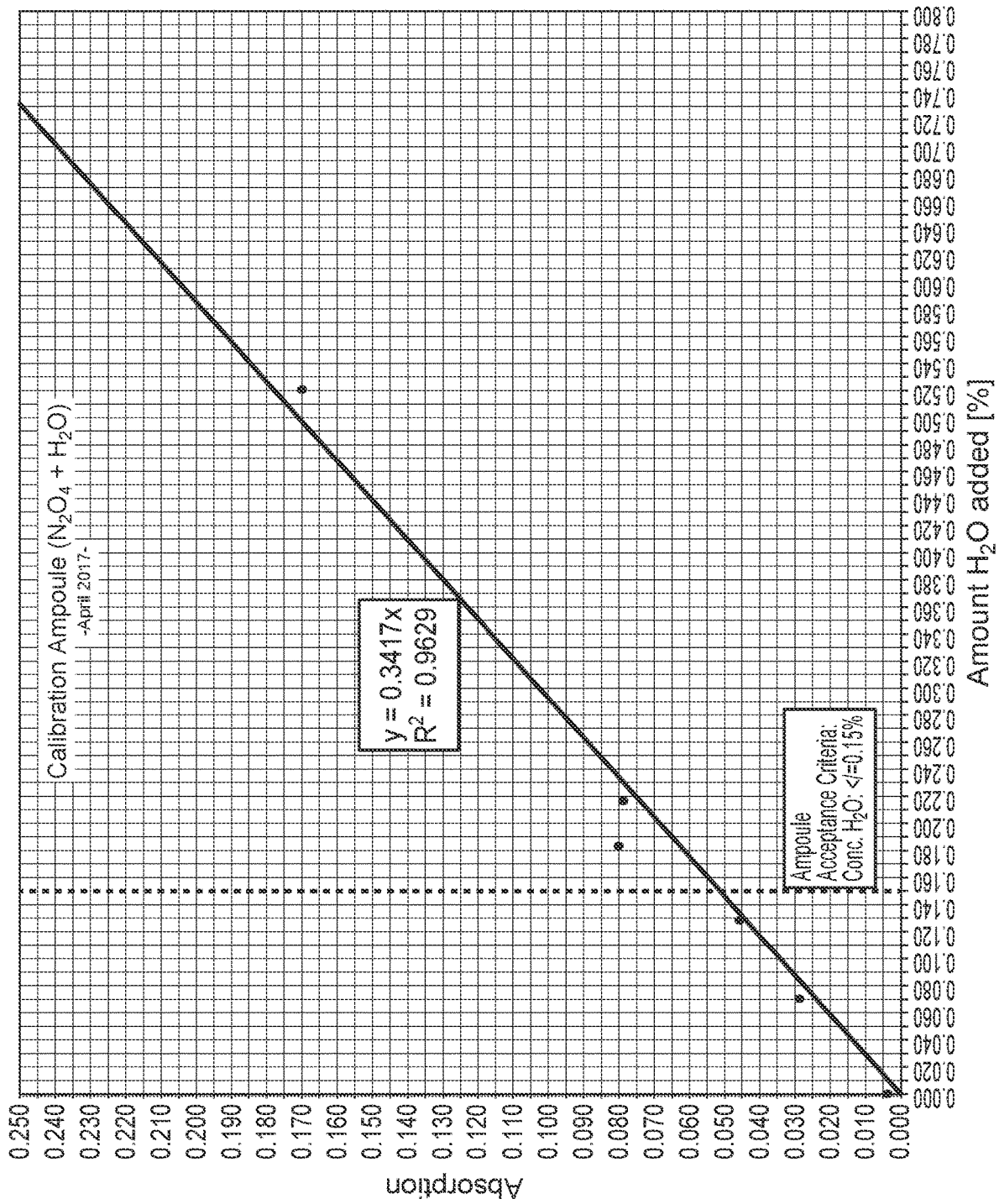
FIG. 10 depicts an example calibration curve for the addition of $H_2O$ to $N_2O_4$ in an Ampoule.
Figure 11:
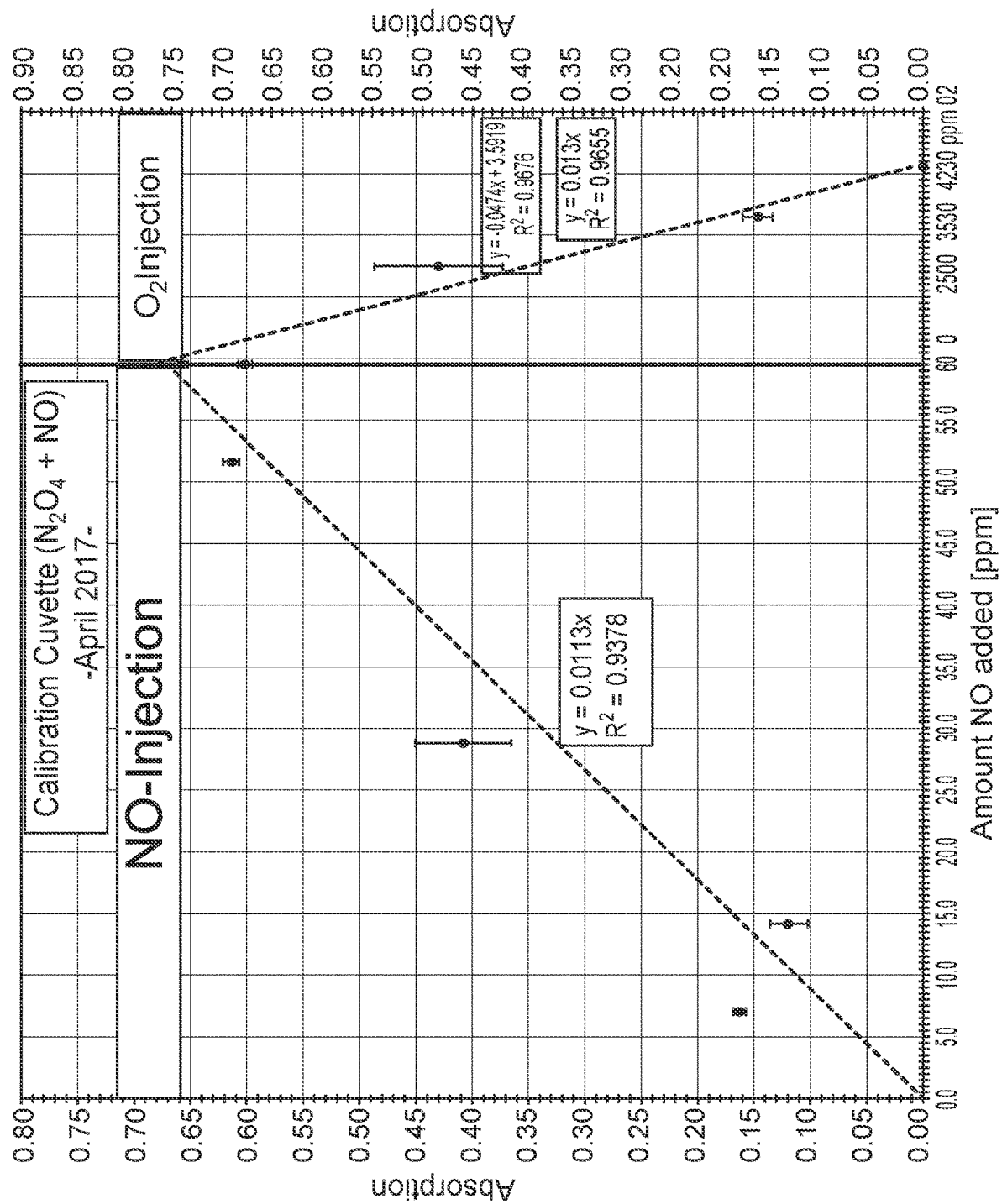
FIG. 11 depicts an example calibration curve for the addition of NO to $N_2O_4$ in a cuvette.

FIG. 7 depicts the resulting calibration curves for the addition of $HNO_3$ to $N_2O_4$ in a cuvette. FIG. 8 depicts the resulting calibration curve for the addition of $H_2O$ to $N_2O_4$ in a cuvette. FIG. 9 depicts the resulting calibration curve for the addition of $HNO_3$ to $N_2O_4$ in an ampoule. FIG. 10 depicts the resulting calibration curve for the addition of $H_2O$ to $N_2O_4$ in an Ampoule. FIG. 11 depicts the resulting calibration curve for the addition of NO to $N_2O_4$ in a cuvette; additionally shown is the decrease of the NO-corrected intensity with the addition of $O_2$.

Conclusion for Standardization

It is shown that calibration standards are made that can be used to determine the concentration of the three potential impurities, Water ($H_2O$), Nitric Acid ($HNO_3$) and Nitric Oxide (NO) (determined as Dinitrogen Trioxide $N_2O_3$), using a Near-Infrared FTIR spectrometer in the two different geometries of a cuvette and an ampoule. The conversion factors are listed in Table 9 for those geometries.

The materials used either show traceability to a manufacturer ($N_2O_4$, $HNO_3$, NO) or through an in-house process ($H_2O$).

Details of one or more embodiments are set forth in the accompanying drawings. Other features, objects, and advantages will be apparent from the description, drawings, and claims. Although a number of embodiments of the invention have been described, it will be understood that various modifications may be made without departing from the spirit and scope of the invention. It should also be understood that the appended drawings are not necessarily to scale, presenting a somewhat simplified representation of various features and basic principles of the invention.

What is claimed:

1. A method for manufacturing nitrogen tetroxide comprising:
   mixing nitric acid and copper in a reaction vessel to form a reaction slurry;
   allowing gas to desorb from the reaction slurry;
   applying $O_2$ as a carrier gas to convert NO that has desorbed from the reaction slurry to $NO_2$;
   collecting the $NO_2$; and
   allowing $NO_2$ to dimerize to $N_2O_4$.

2. The method of claim 1, wherein the collecting is done at dry ice temperature.

3. The method of claim 1, further comprising purifying the $N_2O_4$.

4. The method of claim 3, wherein the purifying step is by distillation through a molecular sieve bed.

5. The method of claim 3, wherein the step of purifying comprising forming a vapor of $NO_2$ and/or $N_2O_4$.

6. The method of claim 5, further comprising collecting the vapor of $NO_2$ and/or $N_2O_4$ and converting it to a purified liquid $N_2O_4$.

7. The method of claim 1, further comprising storing the $N_2O_4$ over a molecular sieve in the presence of $O_2$.

* * * * *